Dec. 18, 1945.  J. R. MacKAY  2,391,060
RECORDING AND INDICATING SYSTEM
Filed March 14, 1939    10 Sheets-Sheet 1
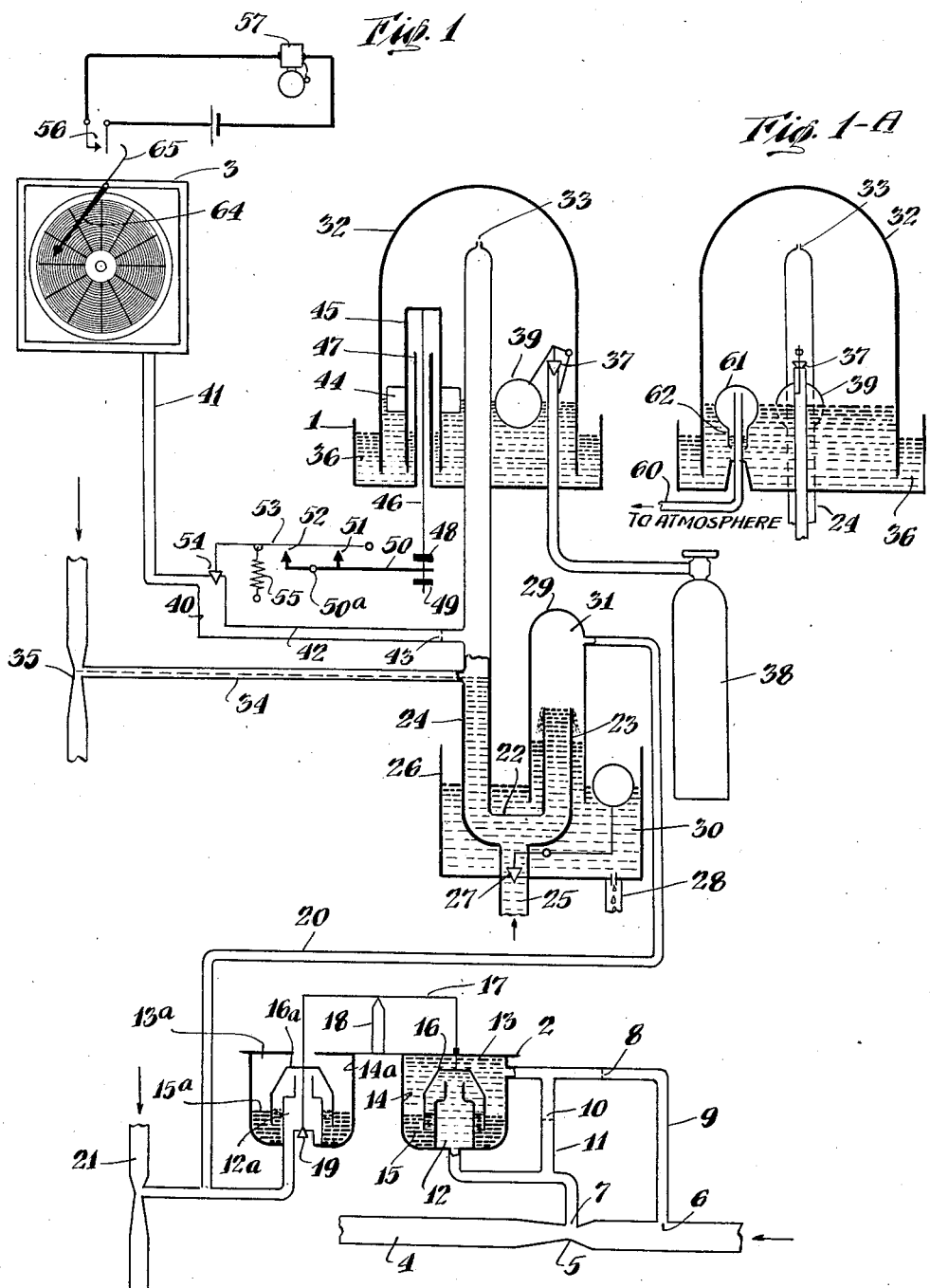
INVENTOR
John R. MacKay
BY
Cooper, Kerr & Dunham
ATTORNEYS

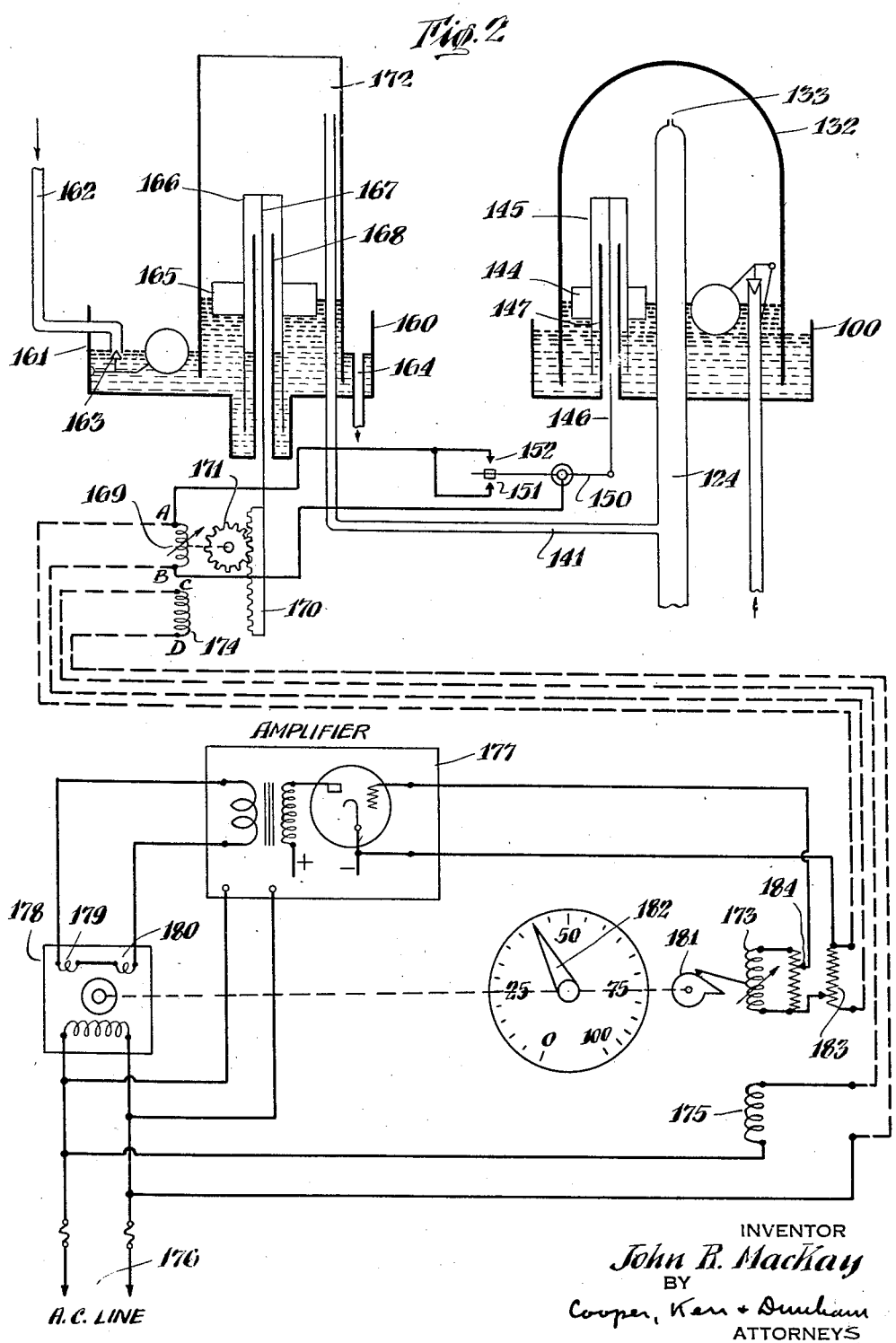

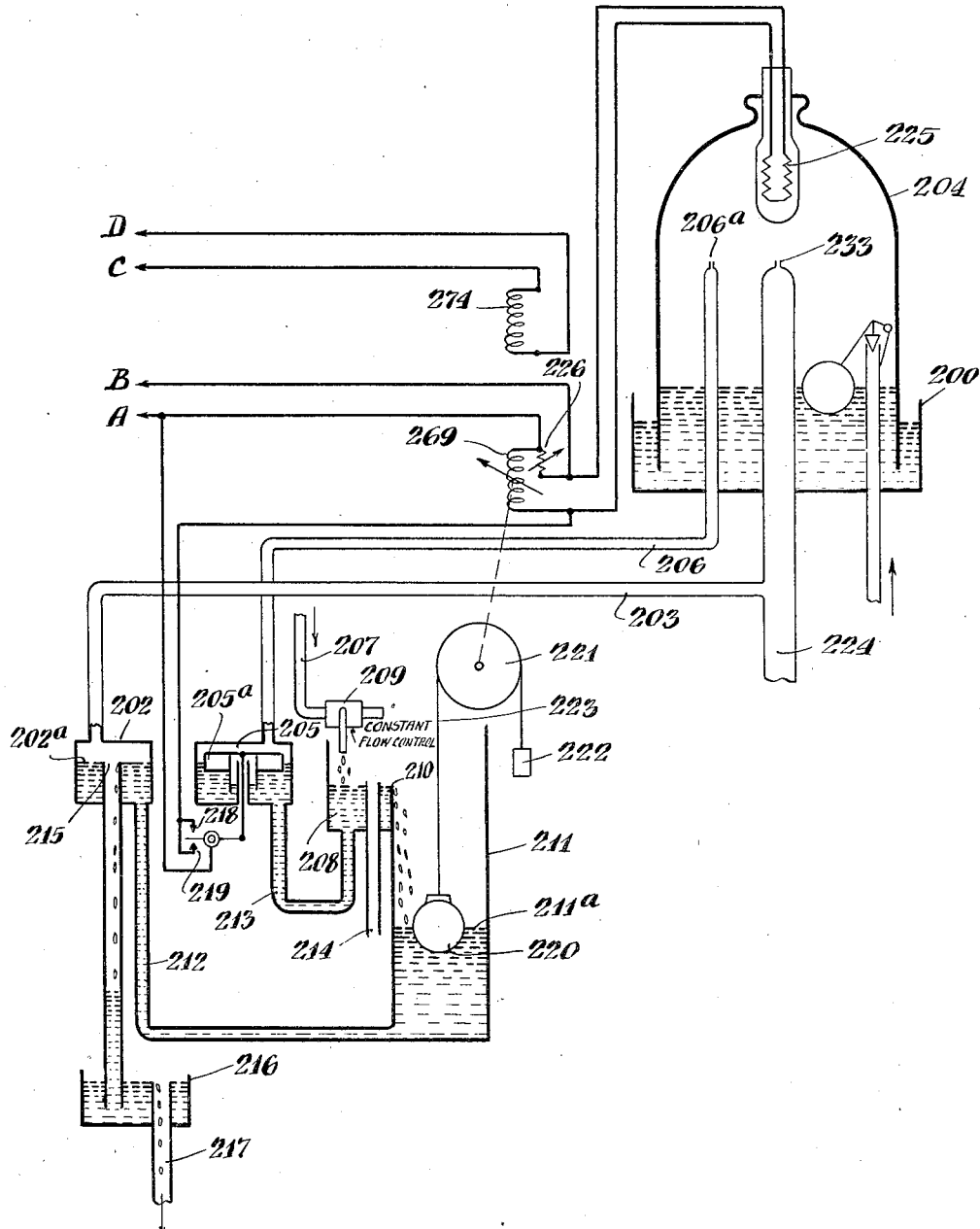

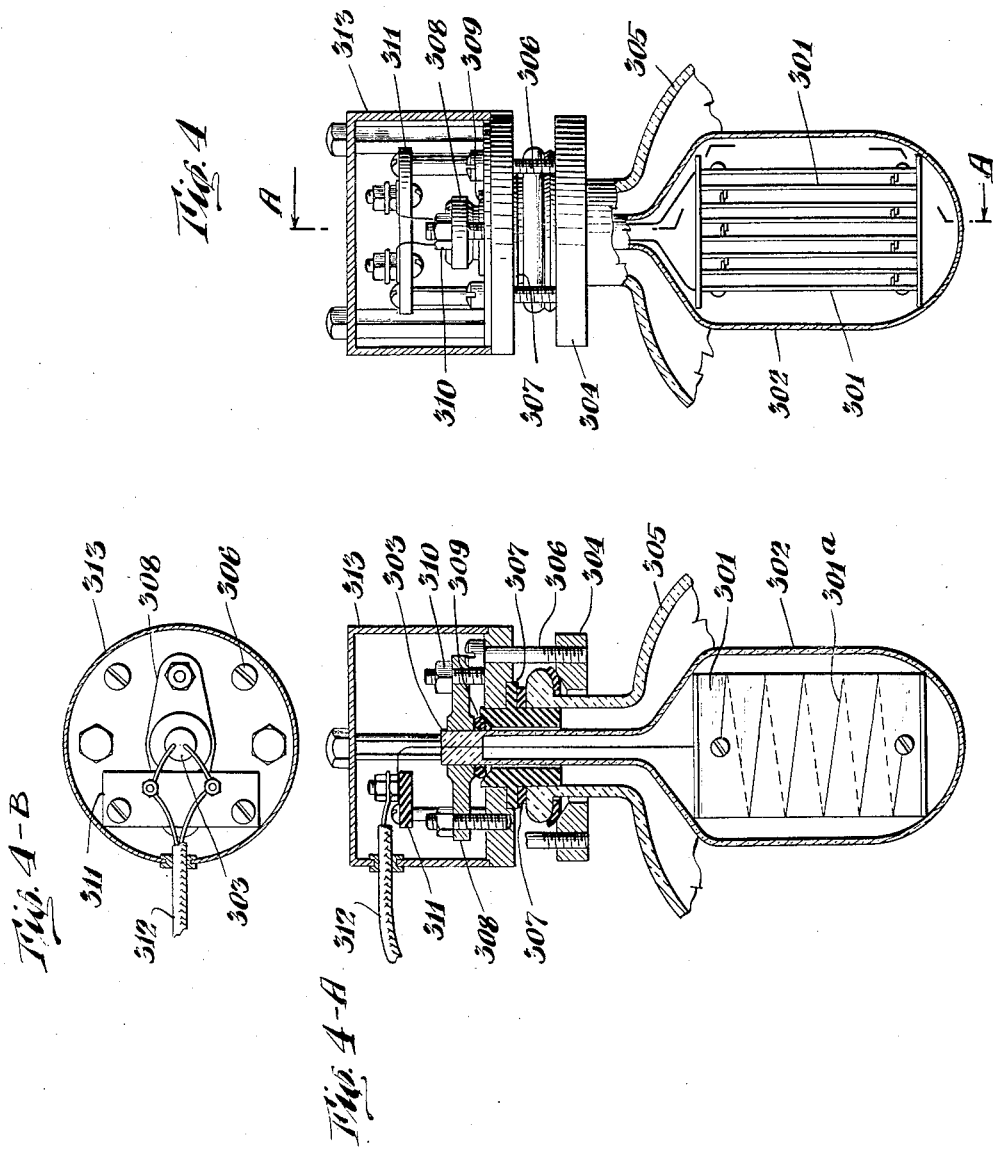

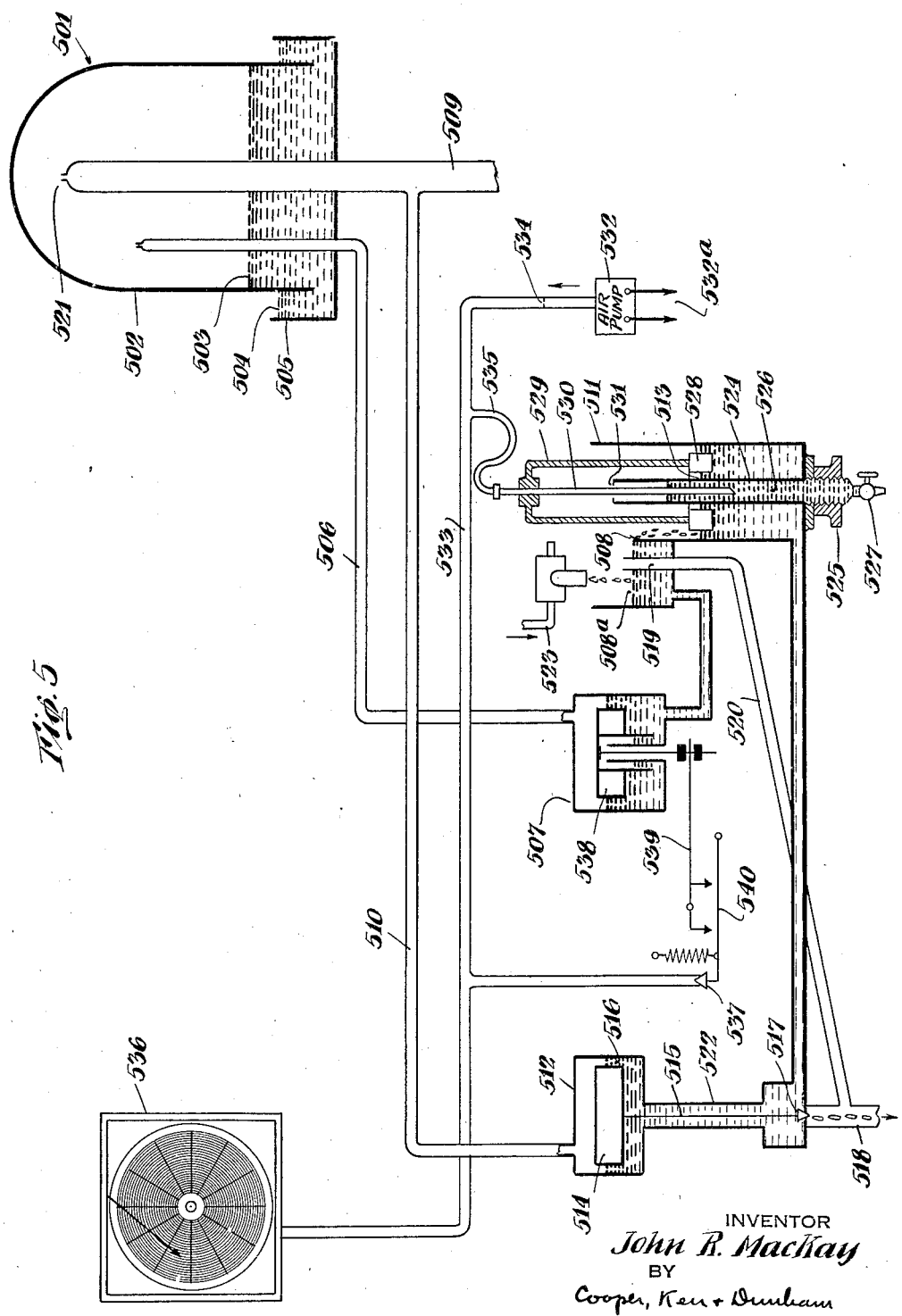

Dec. 18, 1945.   J. R. MacKAY   2,391,060
RECORDING AND INDICATING SYSTEM
Filed March 14, 1939   10 Sheets-Sheet 6
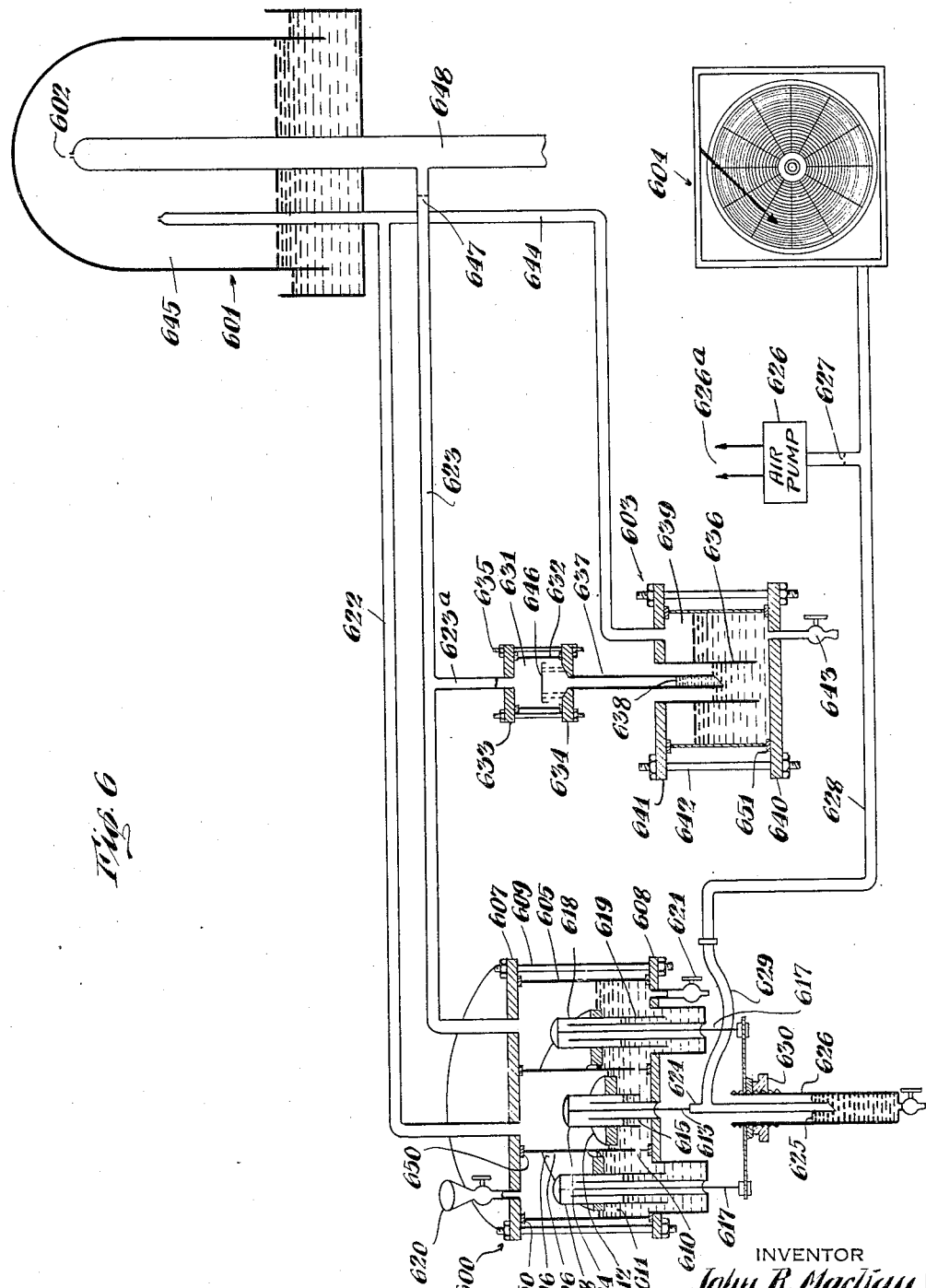
INVENTOR
John R. MacKay
BY
Cooper, Kerr + Dunham
ATTORNEYS.

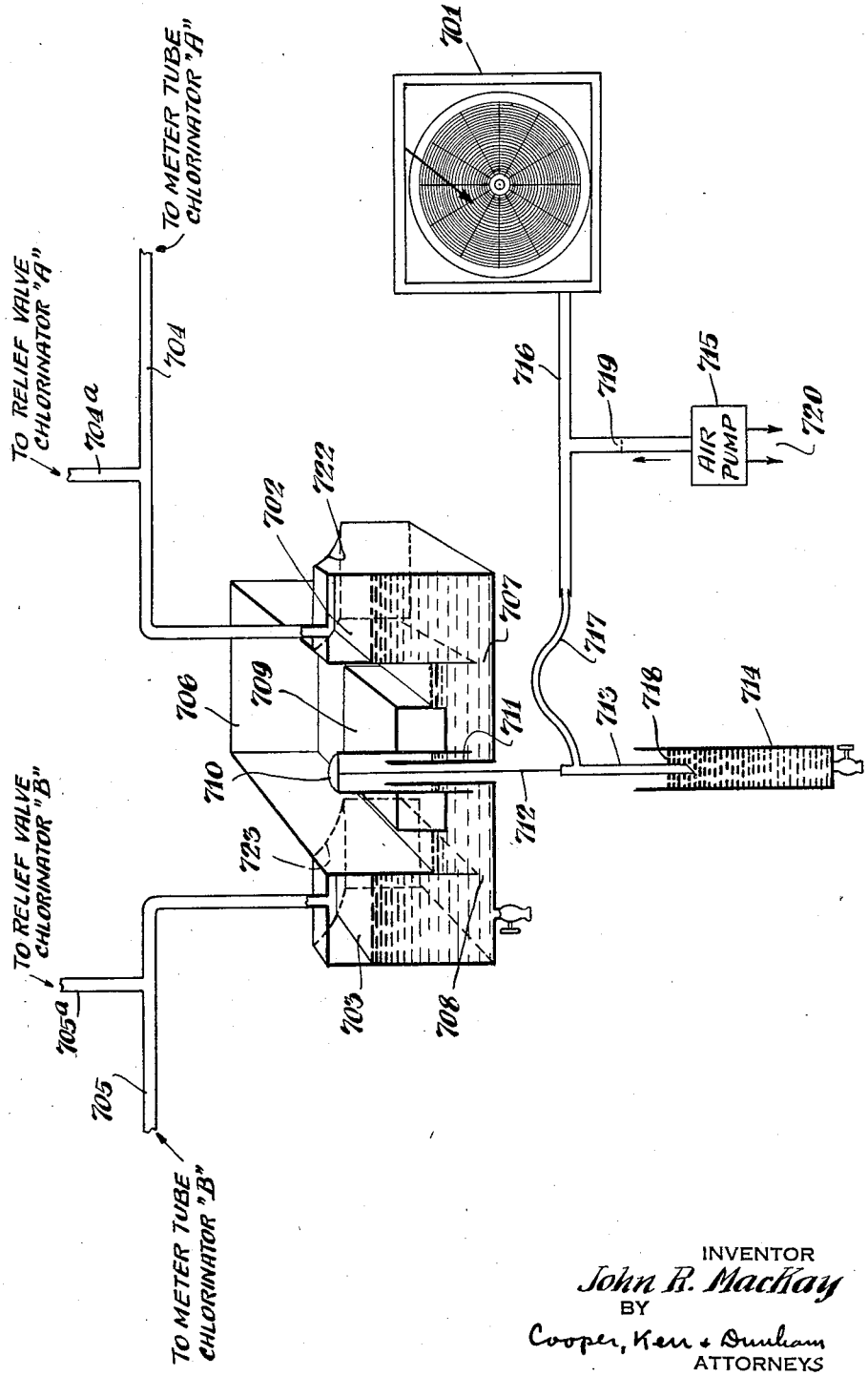

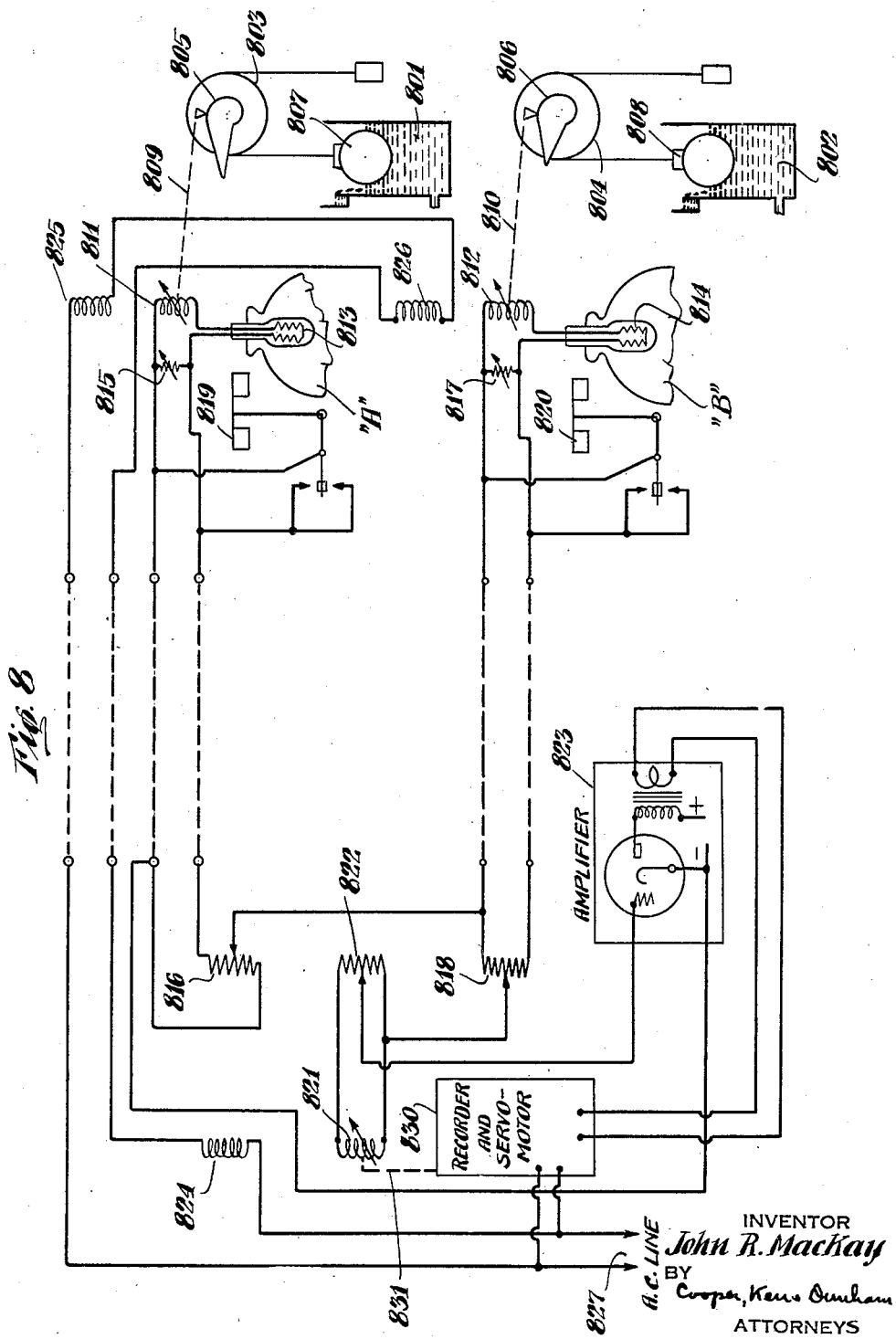

Dec. 18, 1945.　　　　J. R. MacKAY　　　　2,391,060
RECORDING AND INDICATING SYSTEM
Filed March 14, 1939　　　10 Sheets-Sheet 9
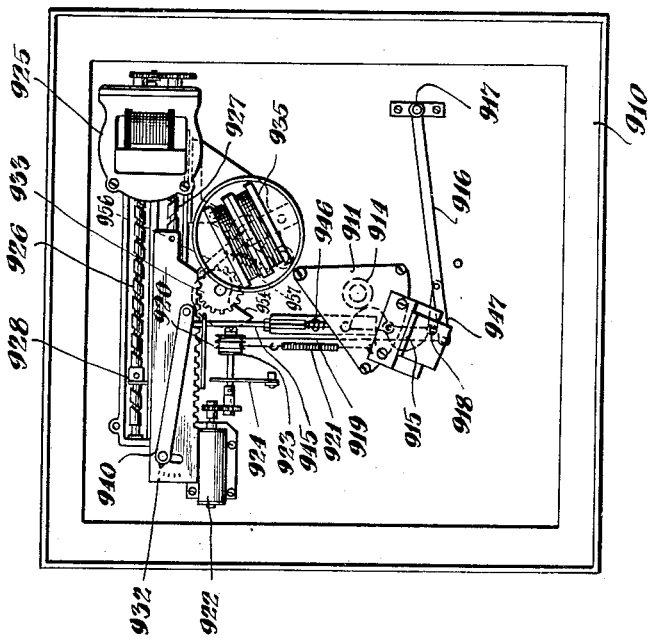
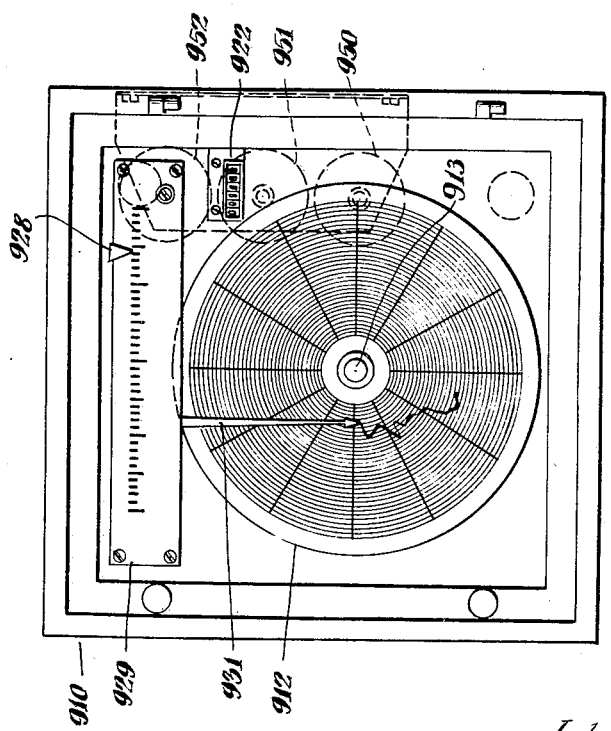
INVENTOR
John R. MacKay
BY
Cooper, Kerr + Dunham
ATTORNEY

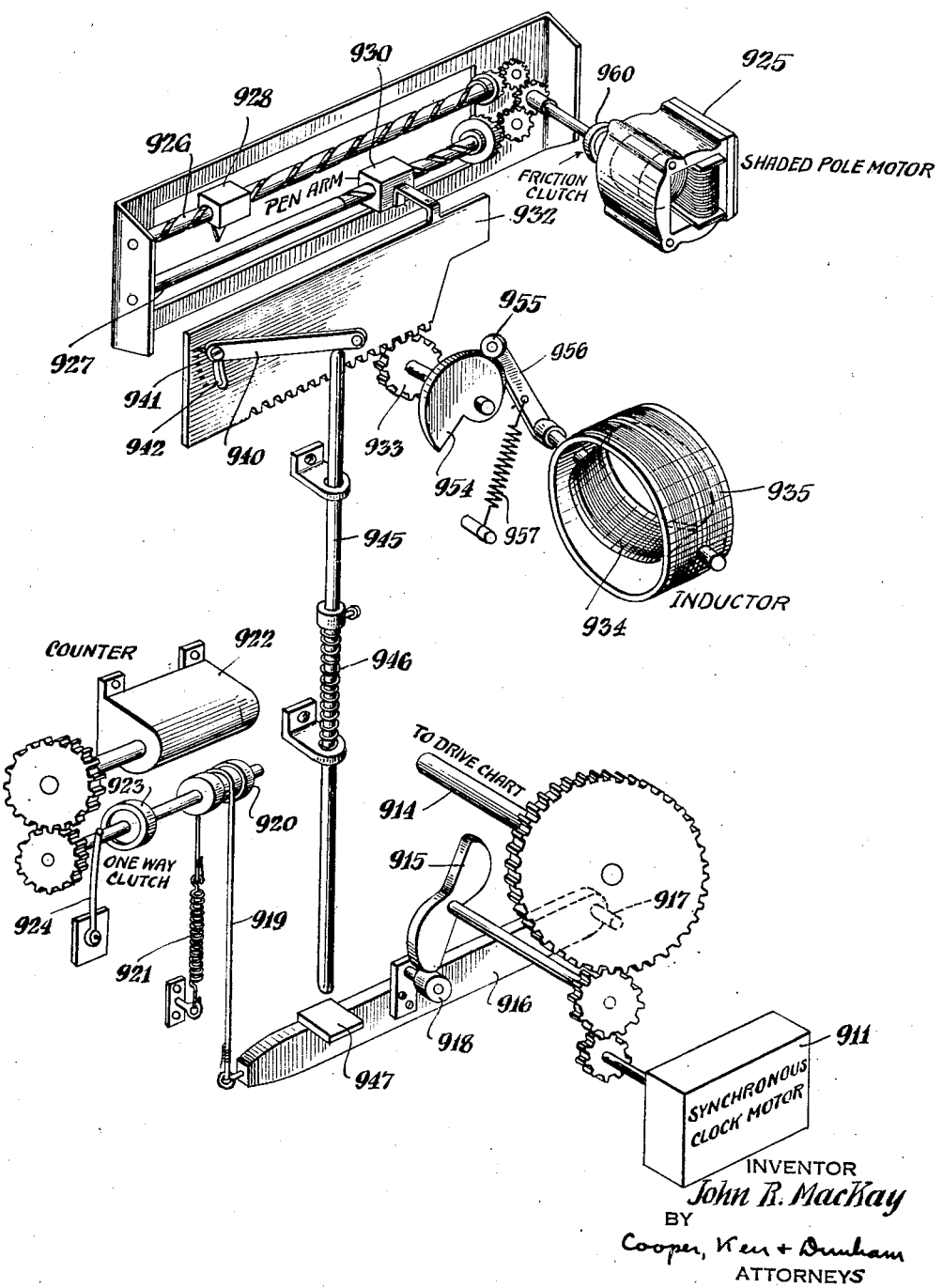

Patented Dec. 18, 1945

2,391,060

UNITED STATES PATENT OFFICE 2,391,060

RECORDING AND INDICATING SYSTEM

John R. MacKay, West Caldwell, N. J., assignor to Wallace & Tiernan Products, Inc., Belleville, N. J., a corporation of New Jersey Application March 14, 1939, Serial No. 261,853
In Great Britain March 23, 1938

37 Claims. (Cl. 210—28)

This invention relates to recording and indicating systems. More particularly it relates to recording or other indicating means and procedure, associable with chemical feed apparatus of the type wherein a fluid or other treating agent is controlled by pressure variations, usually variations of a pressure difference, for feed to the material being treated; and in an important specific aspect, the invention relates to corresponding improvements in or for vacuum type chlorinators and the like, viz. devices wherein the treating fluid, e. g. chlorine gas, is maintained and fed at a pressure lower than atmospheric (i. e., a "negative pressure").

In a particularly satisfactory type of chlorinator the gas is drawn through a so-called metering orifice by a difference of negative pressures on opposite sides of the orifice, and the flow of gas is controlled by varying the pressure difference, conveniently by adjusting the negative pressure on the output side of the orifice. To indicate the gas flow it has been the practice to connect a sensitive vacuum gauge, such as a gauge of the ring balance type or of the diaphragm bellows type, directly to the source of negative pressure under measurement, e. g., the gas output line from the metering orifice of a chlorinator. However, the feeding device usually has means for substituting a flow of air for chlorine when the latter is exhausted, and following such operation, the vacuum gauge will continue to indicate, erroneously, a substantial flow of the treating gas. Furthermore, the specific gravity of the chlorine or like gas changes with the temperature, so that a given pressure difference across the metering orifice may pass varying quantities of the gas, in weight, without such corresponding variation of the vacuum gauge as would record or otherwise indicate the actual amount of gas fed. Another disadvantage of directly connected recording gauges resides in a tendency of the gas to work back into the instrument—the arrangement being particularly undesirable where chlorine is involved, as it is highly corrosive and causes rapid deterioration of the recording device (notably the sensitive elements therein), with consequent loss of accuracy and often complete destruction.

Moreover, negative pressure recording and indicating equipment heretofore available has not lent itself readily to installation remote from the material under treatment, since in the long vacuum lines necessary for such installation, it is difficult to prevent leaks and to avoid bends or deformities in which condensate can collect and form a trap. Another shortcoming of the prior systems is that the measuring instruments must be very delicate and sensitive in order to work with any accuracy over the narrow pressure ranges usually involved, and this disadvantage is greatly enhanced in the case of recording instruments, as even the drag of the pen on the paper chart usually causes a certain amount of error and the least bit of friction due to dust or lack of oil seriously affects the accuracy of the apparatus.

To the avoidance or reduction of the foregoing and other difficulties the present invention is especially directed, and one of its important objects is to provide improved flow recording, indicating and totalizing instrumentalities for use with vacuum type chlorinators and the like, and particularly to enhance the accuracy, reliability, efficiency and adaptability of such instrumentalities.

Further objects are to provide, in apparatus of the character described: means whereby exhaustion of the supply of treating agent will be noted by the indicating instrument; means whereby an abnormal pressure change in the feeding apparatus—e. g., an abnormal decrease of negative pressure in a chlorinator, as by failure of the ejection equipment or the water supply—will be definitely indicated by the recorder or like device; arrangements efficiently and conveniently permitting the location of the recording equipment at any point remote from the chemical feeding apparatus; arrangements providing automatic compensation, relative to the indicating means, for variations in the rate of feed of the treating agent due to the effects of temperature change; arrangements whereby the feeds of a plurality of feeding devices may be summarized or totalized in a single indicating instrument (prior systems described hereinabove not having been adapted for such totalization); improved recording systems and the like for use with corrosive liquids and gases, wherein the corrosive substance is effectively prevented from contact with materials susceptible of attack, in the measuring apparatus or its vicinity; and modifying or amplifying arrangements whereby, for example, negative pressure variations of small magnitude may be converted into proportional positive pressure variations of relatively great magnitude—so as to afford operation of recording devices or the like which are of sturdy construction and which might be relatively insensitive to small pressure variations.

Another object of the invention is to provide systems of the character described, improved in one or more of the foregoing or other respects, wherein the recording or like devices may be operated by pressure, vacuum or electrical control; and an additional object is to provide improved and more efficient procedure for recording, totalizing or otherwise indicating the flow of treating agent in chlorinators and like chemical feeding arrangements.

A further important object is to provide improved, rugged and accurate instruments, particularly adapted for recording and totalizing operations of the character described; and to provide such instruments, which are adapted for electrical control and to afford rapid and reliable response to controlling variations.

Other objects and advantages include those which are hereinafter stated or apparent, or which are incidental to the invention. The nature of the latter will be conveniently explained by reference to the following description and accompanying drawings, which set forth, by way of example, certain presently preferred embodiments of the invention.

In the drawings:

Fig. 1 is a diagrammatic representation of a vacuum type chlorinator having associated therewith improved connections and arrangements of a recording pressure gauge;

Fig. 1A is a diagrammatic side view of part of the chlorinator in Fig. 1, showing other elements;

Fig. 2 diagrammatically illustrates a modified arrangement for recording or indicating the chlorine flow in a chlorinator;

Fig. 3 diagrammatically illustrates further modifications relating, for example, to systems of the sort illustrated in Fig. 2, and including certain further features as hereinafter described;

Figs. 4, 4A and 4B are, respectively, a side elevation partly in section, a section on line A—A of Fig. 4, and a plan view, of a presently preferred form of temperature-compensating control unit diagrammatically included in Fig. 3;

Fig. 5 is another modified form of chlorine indicating system, adapted to operate a positive pressure type of recording instrument;

Fig. 6 is a view, generally diagrammatic, of a further modified recording or indicating system;

Fig. 7 diagrammatically illustrates recorder control arrangements adapted for totalizing the feeds of a plurality of chlorinators or the like;

Fig. 8 is a diagrammatic view of another system, chiefly electrical, for totalized recording or other indication relative to a plurality of feeding devices; and Figs. 9, 9A and 9B show an improved form of recording instrument of the invention, Figs. 9 and 9A being respectively front and rear elevations, and Fig. 9B being an exploded and simplified view in perspective, of certain operating parts.

Referring first to Fig. 1, the illustrated system includes an automatic vacuum type chlorinator (generally designated 1) of the general type disclosed in United States Patent No. 1,777,987, issued October 7, 1930, upon application of Charles F. Wallace, and as diagrammatically illustrated, for example, in Fig. 6 of the cited patent; reference being also conveniently made to other portions of the cited patent, and to Wallace Patents Nos. 1,777,986 and 1,762,706, issued October 7, 1930, and June 10, 1930, respectively, for other structural features of notable utility in or relative to such apparatus. Such a chlorinator proportions the feed of chlorine gas in any desired ratio to the water or other liquid under treatment, and is automatically controlled by a differential converter, generally designated 2, which may conveniently be of the specific type illustrated and described in the cited Wallace Patent No. 1,762,706. To indicate and record the amount of chlorine applied to the water or other liquid under treatment, the system of Fig. 1 may include a vacuum type recording gauge 3, which may itself be of conventional construction—for example, a gauge of the ring-balance or diaphragm bellows types hereinabove mentioned. Although reference to the cited patents will afford a detailed explanation of the principles involved in the operation of both the chlorinator and the differential converter, a brief outline of the same is herein set forth, for convenience in explaining the improvements embraced by the present invention.

As the water to be treated in a main 4 flows through a Venturi tube 5, a differential pressure is created between the inlet 6 of the Venturi tube and its throat 7. In practice these pressures usually range anywhere between 12 inches and 200 inches of water. As differential pressures in excess of 12 inches of water are seldom desired for operation of a differential converter of the specific type shown, it is possible to reduce the pressure difference by means of a flow restricting orifice 8 in the high pressure lead 9 to the converter and a differential reducing orifice 10 in a by-pass line 11. It will be readily seen that by proper proportioning of the orifices 8 and 10 any desired range of differential pressures can be obtained across the orifice 10, and as the same physical laws apply both to the flow of water through an orifice and through a Venturi device, these secondary differentials will also bear a direct relationship to the differentials produced across the Venturi tube 5.

The differential pressures developed across the orifice 10 are applied to the chambers 12 and 13 of the pot 14 in the differential converter 2. At the low pressures involved, an effective seal between the two chambers is obtained with a body of mercury 15 which permits an inverted nickel cup or bell 16 (enclosing chamber 12) to move up and down and thereby exert a variable pull on a beam 17 which is pivoted on a straight edge or fulcrum 18.

On the opposite side of the differential converter 2 is a pot 14a which may be of similar size and construction to the pot 14. It is also divided into two chambers, 12a and 13a by the inverted bell 16a and a mercury seal 15a. In addition an air valve 19 is attached to the bell 16a which in turn is also carried by the beam 17. The lower chamber 12a communicates with a vacuum line 20 and an aspirator 21 as shown while the upper chamber 13a is open to the atmosphere.

Assuming for purposes of explanation that the vacuum line 20 is temporarily closed (as by a valve, not shown), it will be readily understood that the aspirator 21 will create a vacuum inside the chamber 12a, which will be just sufficient to counteract the torque exerted on beam 17 by the differential applied to the chambers 12 and 13 of the pot 14, the valve 19 assuming a throttling position and relieving the aspirator 21. The negative pressure in the chamber 12a will, as a result, be directly proportional to the drop across the pressure reducing orifice 10 and the Venturi device 5.

Considering now the chlorinator 1, it will be noted that a U-tube 22 having a short leg 23 and a long leg 24 is supplied with water through an inlet 25. This water overflows the short leg 23 and is maintained at a constant level in a surrounding box 26 by the float valve 27. As a waste outlet 28 having a small orifice is provided, there will always be a small flow of water over the edge of the short U-tube leg 23, which will be equal to the loss of water through the waste outlet 28. A tube 29 is inverted over the leg 23 with its lower edge extending below the surface of the water 30 in box 26, and the vacuum line 20 from the differential converter 2 is connected to the chamber 31 thus formed. The long leg 24 of the U-tube 22 extends upward into the bell jar 32 of the chlorinator and terminates in a calibrated metering orifice 33. In addition, a line 34 is connected to the U-tube leg 24 at a point which may be conveniently disposed at a predetermined distance, say exactly two inches above the top of the short U-tube leg 23. This line 34 is run in turn to an aspirator or injector 35 which discharges into the water under treatment in the main 4.

The tray 36 of the chlorinator, into which the bell 32 extends, is supplied with water through an auxiliary water line and constant level apparatus, not shown, so that the level of the water external to the bell jar is maintained at a predetermined distance above the bottom of the tray 36. As the throat of the injector or aspirator 35 is located in this case just two inches above the top of the short U-tube leg 23, it is compelled to lift the water in the long U-tube leg 24 a distance of two inches when no vacuum exists in the line 20; and as the leg 24 communicates with the inside of the bell jar 32, the level of the water inside the bell jar is also raised a distance of two inches above the level of the water external to the bell jar in the tray 36.

Within the bell jar there is disposed a chlorine pressure reducing valve 37 which controls the entrance of chlorine gas that is stored under high pressure in the cylinder 38. The valve 37 is actuated by the float ball 39 and is conveniently so adjusted that no chlorine is permitted to enter the bell jar until the vacuum in the U-tube leg 24 increases over its normal value of two inches and tends to raise the water level in the bell jar 32.

Let it now be assumed that a flow of water exists in the main 4, causing a differential pressure across the Venturi device 5 with a resultant vacuum of, say, four inches of water in the chamber 12a and vacuum line 20. This increase of negative pressure creates a tendency for the water in the U-tube leg 24 to drop an additional four inches, but by reason of the action of the aspirator or injector 35 the water is maintained at a level with the center of the aspirator or injector throat, (the suction device now lifting a total of 6 inches of water) and an additional four inches of vacuum attempts to form under the bell jar 32. However, the result is to cause the water level within the jar to rise slightly and open the chlorine pressure reducing valve 37, whereupon the tendency toward an additional 4 inches of vacuum in the jar is relieved by the resulting flow of chlorine gas through the calibrated orifice 33; the flowing chlorine being thereafter mixed with the water in the line 34 and suction device 35, and thus carried to the main 4.

From the foregoing outline, it will now be understood that any variation in the rate of flow of water through the main 4 will result in a variation in the vacuum applied to the injector side of the calibrated orifice 33 and thereby cause a corresponding predetermined variation in the quantity of chlorine gas being drawn through the orifice, so that the chlorine is always applied to the water under treatment in a desired proportion to the rate of flow of the water as determined by the Venturi meter 5.

However, if the supply of chlorine gas in the cylinder 38 becomes exhausted, it can no longer operate to relieve the tendency toward increasing negative pressure under the bell jar 32 during periods of flow in the main 4; and under such circumstances, the water level in the bell jar will rise. A trap is conveniently provided for introducing air, as from the outside atmosphere, into the bell jar upon rise of the water to a predetermined level. As shown in Fig. 1A, this trap may conveniently comprise a tube 60 passing up through the bottom of the tray 36 into the bell jar. The open end of the tube is covered by a hollow ball 61 which floats upon the water in the bell jar and which has a stem 62 that fits over the tube. Since the tube 60 communicates with the atmosphere, the pressure within the ball 61 is atmospheric, and the water level in the stem 62 is the same as in the tray 36. Should the water level in the jar rise, the ball float 61 rises until its lower end passes the lower water level, whereupon the outside air will rush into the bell jar, so as to prevent further rise of the water level therein. In other words, upon operation of the air relief trap just described, air, in lieu of gas, will be drawn through the metering orifice 33, in proportion to the flow of water in the main 4 just as if gas were still being supplied.

It will also be noted that if the aspirator or injector 35 should become clogged, or if its water supply should fail, or if the chlorine pressure reducing valve 37 should pass too much gas, the normal two-inch vacuum in the bell jar would be reduced and the water level in the latter will drop substantially below the normal two-inch level—for example, to or below the level of water in the exposed part of tray 36. The air relief trap is so designed as to prevent recession of the water level in the jar to a point where gas may bubble out below the lower edge of the jar; this and other characteristics of the illustrated form of relief trap being more fully shown and described in United States Patent No. 1,514,939, issued November 11, 1924, upon application of Charles F. Wallace.

As previously explained, direct connection of a recording type vacuum gauge to the suction side of the metering orifice 33 in accordance with prior practice, has not afforded any indication of chlorine exhaustion; on the contrary, the substituted air flow is erroneously recorded as if it were gas. Similarly the arrangements of previous practice have afforded no immediate, positive indication in the event of substantial recession of the water level in the bell jar from its normal position, as under one or more of the circumstances mentioned above.

According to the present invention, the recording vacuum gauge 3, which may be of any type suitable for operation over the range of negative pressures involved, is connected through a line 41 to a valve chamber 40 which includes an air-introducing valve as hereinafter explained. Another line 42 connects the valve chamber 40 with the suction side of the metering orifice 33 at some point above the level of the throat of the injector or aspirator 35. The line 42 preferably includes a small orifice 43, of the nature of a flow restricting orifice, for purposes hereinafter explained; this orifice also serving to reduce the effect, on the gauge 3, of any pulsations which may exist within the metering chamber of the chlorinator.

Within the bell jar 32 and supported by the water therein, a hollow ring type float 44 (conveniently of hard rubber or other chlorine-resisting material) is mounted upon, and supports, a tubular support 45 which carries, depending therefrom, a valve-controlling rod 46. A tube 47, conveniently surrounding the rod 46, extends up from the bottom of tray 36 into the tube 45, as shown, to provide a water seal about the exit of the rod 46 from the chlorinator chamber—the upper end of the tube 45 being closed, and the interior of the tube being open to the atmosphere through tube 47. In this way, the rod 46 may move vertically in response to variations of water level in the bell jar (where the member 44 floats), without reducing the vacuum within the bell jar and without appreciable friction loss in the movements of the rod.

The lower part of the rod 46 carries a pair of spaced collars 48, 49 (a convenient construction being to thread the lower part of the rod and to provide the collars in the form of lock nuts secured thereon), which are disposed to engage respectively, upon vertical displacement of the rod in one direction or the other, the upper side or lower side of a lever 50. The lever 50 is pivoted at 50a and has upwardly projecting studs 51, 52, on either side of the pivot, the studs being adapted, when the lever is rocked, to engage and rock upwardly another lever 53. Upward displacement of the lever 53 is adapted to open the air valve 54, connected thereto, and the lever 53 is biased downward by the spring 55, so that the valve 54 is normally retained in closed position. The collars 48, 49 are advantageously so positioned on the rod 46 that the lever 50 will be rocked and the valve 54 opened (through the operation of stud 51 or stud 52 depending on the direction of displacement of lever 50), upon a predetermined displacement of the water level within the bell jar 32—for example, any displacement greater than plus or minus 1/8 of an inch from the normal level in the bell jar.

When the valve 54 is opened, as in the manner just explained, any vacuum existing in the gauge line 41 is relieved and the recording gauge 3 immediately moves to zero position, or to what may be preferably a sub-zero position if the gauge is adjusted for normal operation over a range of negative pressures. A pair of normally open contacts 56 may conveniently be arranged to control the energizing circuit of a bell 57, as shown, and the arm 64 of the recording gauge may have an extension 65 disposed to close the contacts 56 upon movement of the arm to, say, its sub-zero position, as just explained. Thus either upon exhaustion of the chlorine supply (causing an abnormal elevation of the water level in the bell jar) or upon failure in other respects (causing a recession of the water level) the gauge will move to a predetermined low position, and at the same time an audible or other alarm may be operated to warn the attendant that something is wrong with the apparatus. Where the gauge 3 is of the recording type it will thus form a permanent record of the existence and duration of the abnormal condition in the chlorine apparatus.

It may now be explained that by virtue of the small size of the orifice 43 in the line 42, the described movement of the recorder arm 64 to its sub-zero position will take place immediately upon even a very slight opening of the valve 54—so that the operation is positively and rapidly responsive to the occurrence of the abnormal condition. It may also be explained that while in some cases the stud 52, which provides for response to a depression of the water level, may be omitted, its inclusion is preferable in many cases, inasmuch as the resulting control affords an immediate and clean cut return of the recorder pen arm to a low or sub-zero position whenever the water level of the bell jar falls appreciably below its normal and proper height.

It will be understood that the arrangement for relieving the vacuum within the gauge line 41 may be embodied in other forms; for example, the valve 54 may be of the electro-magnetic type, and the studs 51 and 52 arranged to operate contacts for its energization. Or in other cases, a relief trap of the kind generally designated 603 in Fig. 6, as hereinafter described, may be substituted (with an associated line to the interior of the bell jar) for the valve 54 in the gauge line 41, 42, and for the associated instrumentalities operating the valve under control of the float 44—such relief trap serving, as hereinafter explained, to increase the pressure in an associated vacuum line (e. g., the line 41—42) to that of the atmosphere upon a predetermined variation of the negative pressure within the bell jar.

A further improved form of indicating and recording system is illustrated in Fig. 2, wherein an electrical recording, indicating and totalizing instrument (such as illustrated in Figs. 9, 9A and 9B hereinafter described) may be operated in response to variations in the feed of a chlorinator or the like. Such system, including an electrical control for the recording instrument, permits the disposition of the latter at any desired point remote from the chlorinator, and not only permits a more reliable indicating operation, but also is such that there is no opportunity for the corrosive gas or any solution of it to come in contact with the delicate parts of a recording instrument or the like.

In Fig. 2 the chlorinator, generally designated 100, is represented, for convenience of illustration, simply by the bell jar 132, metering orifice 133 and certain immediatley associated instrumentalities; it being understood that in this and other figures wherein the chlorinator is simply represented by a bell jar and metering orifice, the complete structure of the chlorinator may be, for example, as diagrammatically represented in Fig. 1, and as further and more specifically disclosed in one or more of the Wallace patents hereinabove identified. The arrangement of Fig. 2 also conveniently includes a float 144 carried by the water within the bell jar, and having an associated inverted cup or tube 145 and an upwardly extending tube 147 in the latter, together with a downwardly depending rod 146—all arranged and constructed in similar fashion to elements 44 to 47 inclusive of Fig. 1, so as to afford vertical displacement of the rod 146 in accordance with vertical displacement of the water level in the bell jar. In the embodiment of Fig. 2, however, vertical movement of the rod 146 is arranged to rock a contact operating lever 150 for closure of contacts 151 or 152, respectively, upon upward or downward movement of the rod.

For control of the recording or other indicating means, a transmitting device generally designated 160 is provided, and includes a hard rubber tray 161 into which water is introduced through a line 162, and in which the level of water is maintained constant by a float valve 163; an overflow pipe 164 conveniently preventing the water level in the exposed portions of the tray from exceeding a desired predetermined height. A ring type float 165 of hard rubber surrounding and carrying an inverted silver cup or tube 166 from which depends a rod 167 through an inner water sealing tube 168—these elements being conveniently similar in structure and function to the elements 44 to 47 inclusive of Fig. 1—are provided for the operation of the rotor 169 of an electrical transmitting device, through the medium of a rack 170 which is vertically displaceable by the rod 167 and which is adapted to rotate a pinion 171 connected to the rotor 169.

An inverted cup or bell 172 has its lower edge disposed below the level of water in the tray 161, and is arranged to enclose the float 165 and tube 166, as shown, and it will now be understood that by virtue of the vacuum line 141, conveniently extending into the upper part of the bell 172 and connected with the suction line 124 from the metering orifice 133 of the chlorinator (in the same manner as the line 41—42 of Fig. 1) the same negative pressure will be created within the bell 172 as exists in the suction line 124 of the chlorinator. In consequence the level of the water in the transmitting device 160 will be raised in the bell 172 above the level of the water in exposed parts of the tray 161, and to an extent which will vary in accordance with variations in the negative pressure on the suction side of the chlorinator metering orifice. Hence, the float 165, carried by the water within the bell 172, will move up and down in accordance with the negative pressure variations, and the rotor 169 of the electrical transmitting instrument will be rotated accordingly, by virtue of the corresponding displacement of rod 167 and the rack and pinion.

Insofar as variation of the vacuum in the bell 172, with concomitant displacement of the water level therein, may tend to vary the water level in the exposed portions of the tray 161, the water level in the latter will nevertheless be maintained constant by the operation of the float valve 163 and overflow pipe 164, as hereinabove explained.

Although the electrical telemetric or transmitting system for operating an indicating device in accordance with rotation of the pinion 171 may be embodied in various forms—for example, systems of the type disclosed and claimed in my Patent No. 2,243,349, granted March 11, 1941, for Motor control apparatus, may be satisfactorily employed in some cases—it is at present preferred to employ arrangements such as are disclosed and claimed in my Patent No. 2,336,994, granted December 14, 1943, for Proportional control systems and procedure; and a system of the type shown in the last cited patent is, therefore, diagrammatically illustrated, reference being conveniently had to the said patent for a more detailed description and explanation thereof.

The electrical system shown includes a transmitting inductor device having a rotor 169, a stator 174, and a receiving inductor device having a rotor 173 and a stator 175. The stator windings 174 and 175 are conveniently connected in series with each other and with an alternating current line 176, for energization therefrom. The rotors 169 and 173 are connected in series with the input of a vacuum tube amplifier 177, and in series opposition with each other so that their respective induced voltages are opposed, i. e., the connection of the rotors being such that when they are in a predetermined angular relation to each other, the sum of their voltages (applied to the input of the amplifier) is zero. Under such circumstances, when one of them, e. g., the transmitting rotor 169, is displaced so that such relationship no longer exists, a differential voltage is produced, across the input of the amplifier, which is proportional to the magnitude of the positional change, and according to the direction of change, is either in phase or approximately opposite in phase with respect to the alternating current in the line 176.

The amplifier 177, which is diagrammatically illustrated as comprising a single stage but which preferably includes a plurality of stages, advantageously has its input so biased that no current flows in the circuit of the rotors 169 and 173 at any time; and the amplifier is thus controlled only by the differential electromotive force, when and if it exists, in the rotor circuit, in such manner and with such advantages as are more fully explained in my aforesaid Patent No. 2,336,994. A shaded pole motor 178 has its field winding energized from the alternating current line 176, and is provided with a plurality of wound shading coils, conveniently disposed and connected in opposition, or in opposed sets, so that when no electromotive force is applied to the input of the amplifier 177, the motor remains stationary; the connections also being such that when a voltage is produced across the input of the amplifier, the opposed shading coils, diagrammatically represented by the coils 179 and 180, are energized from the output of the amplifier, so that the motor 178 is driven in such direction as to displace the rotor 173 (mechanically connected for such displacement by the motor) until voltage balance is restored in the input circuit of the amplifier, whereupon the motor stops.

The motor is also mechanically connected to operate a recording or indicating device generally illustrated by the indicator 182; it being understood that the device 182 may be a recording, indicating and totalizing instrument of the character shown in Figs. 9, 9A, and 9B, or may be embodied in other forms. In order to provide a straight-line or other predetermined character of response to variations of chlorine flow, the mechanical connection intermediate the motor 178 and the receiving rotor 173 may include a suitable cam 181 or other translating means, to compensate for non-linearity of response in the pressure-sensitive instrumentalities relative to actual changes of chlorine flow.

As previously stated, the nature and operation of the electrical circuits and their attendant instrumentalities are more fully set forth in my aforesaid Patent No. 2,336,994, and the arrangement and control of the shaded pole motor are also more fully explained in my aforesaid Patent No. 2,243,349—it being normally preferred, for instance, that the motor include four shading coils, arranged in opposed sets, instead of merely two opposed coils as here shown for simplicity of illustration. As likewise brought out in my Patent No. 2,336,994, the voltage outputs of the inductor rotors 169 and 173 may be respectively proportioned by the potentiometers or voltage dividers 183 and 184—the potentiometer 183 serving to proportion the transmitted control secondarily (i. e., to vary the ratio of movement between the rotors) and the potentiometer 184 being for "spread control," i. e., to amplify or contract the movements imparted to the rotor 173 (and particularly to the indicator 182) by the motor 178 for given displacements of the transmitting rotor 169.

It will now be seen that variations in negative pressure at the suction side of the metering orifice 133 of the chlorinator, which correspond to the variations in rate of flow of chlorine, will effect corresponding adjustment of the transmitting rotor 169; and through the electrical instrumentalities just described, the receiving rotor 173 will be caused to follow up, and the meter device 182 will be caused to indicate or record, such variations. It will be noted that the contacts 151 and 152 are connected in parallel with each other across the rotor 169; hence upon vertical displacement of the rod 146 (caused by exhaustion of the chlorine supply or by other abnormal condition, as explained in connection with the displacements of rod 46 in Fig. 1), the transmitting rotor will be short-circuited, and the resulting voltage in the amplifier control circuit—being the output voltage of receiving rotor 173—will cause the motor to drive the indicator 182 to a predetermined zero or sub-zero position. As explained in connection with the gauge 3 of Fig. 1, such may conveniently be an indicator position below any reading normally arrived at, even for zero chlorine flow, so that special and positive indication is afforded of the abnormal condition in the chlorinator. It will also be understood that although they are not illustrated in this and subsequent figures, suitable alarm contacts, like the contacts 56 in Fig. 1, may be arranged for operation by the indicator upon its arrival at zero or sub-zero position, so as to give an audible or other distinctive alarm when it is displaced to that position.

Fig. 3 illustrates a further form of the invention, which includes arrangements automatically compensating for what might otherwise be a somewhat erroneous indication of gas flow, arising from temperature variations which affect the actual weight of gas flowing (without change in the controlling negative pressure), as hereinbefore explained. The arrangement of Fig. 3 also includes a form of transmitting unit which even more effectively isolates the chlorine from delicate parts or devices that might be deleteriously affected by its corrosive fumes; in these and other respects, the arrangement of Fig. 3 being at present preferred, in some cases, over arrangements shown in the preceding figures.

The chlorinator 200, generally indicated by an illustration of its bell jar 204 and certain of its attendant parts, may be as previously described. The suction side or U-tube leg 224, extending from the metering orifice 233, is connected to a chamber 202 by a line 203, this connection to the suction side of the metering orifice being conveniently made in the manner of the line 41—42 of Fig. 1. The negative pressure within the bell jar 204 (i. e., what is normally a vacuum of, say, two inches) is also transmitted to a chamber 205 through a line 206, which conveniently terminates at a point well above the water in the bell jar and is conveniently provided, at its said termination, with a small orifice 206a.

A water line 207 is arranged to provide a relatively small flow of water into a constant level box 208, and the water supply thus provided from the line 207 is maintained at a constant rate by a controlling device 209 in the water line; it being understood that constant flow devices of such character are known and available, such as, for example, a diaphragm-operated rate of flow controller, which will produce a constant flow independent of pressure fluctuations in the supply. One type of such device is shown in Booth Patent No. 2,229,038, issued January 21, 1941, for Liquid feeding apparatus, at the right-hand side of Fig. 2 of said patent, the device being there identified as the differential valve 58.

The small but constant stream of water entering the box 208 continuously overflows an associated weir 210, and thus passes down into a water chamber 211, which in turn forms one leg of a U-tube, the other leg 212 of the U-tube comprising a pipe which opens into the bottom of the chamber 202. The constant level box 208 is directly connected with the chamber 205, by means of another U-tube, for which the box 208, in effect, forms one leg, and for which the other leg is provided by a pipe 213 opening into the bottom of the chamber 205.

It will now be understood that if no vacuum is created by the chlorinator, i. e., in either of the lines 203 and 206, both legs of both U-tubes will fill with water to a level permitted by the height of an overflow pipe 214 in the box 208. However, even at zero flow of chlorine, there is a predetermined normal vacuum within the chlorinator on both sides of its orifice 233—say, a vacuum equal to two inches of water—and consequently, under such circumstances, the water levels in the chambers 202 and 205 will be two inches higher than the level in the open legs 208 and 211 of the U-tubes. In other words, the water level in the chamber 205 will be two inches above the upper edge of the weir 210, and the water line 211a in the chamber 211 will be two inches lower than the water level 202a in the chamber 202—it being understood that the flow of water from controlling devices 209 is sufficiently small to prevent such a large flow of water through the U-tube including pipe 212, as would result in appreciable friction loss therein. The chamber 202 is conveniently provided with an overflow pipe or circular weir 215 so that excess water may be passed down to an overflow box 216, from which it may run to waste via a further overflow tube 217.

Let it now be assumed that by a reduction in pressure, i. e., an increase of vacuum, on the suction side of the metering orifice 233, a flow of chlorine is initiated through the metering orifice. An increased vacuum will thus at the same time exist in the chamber 202, and effect a proportionate depression of the water level in the tube or vessel 211—the excess water being rapidly spilled over the weir 215 until equilibrium is obtained. If there is a subsequent increase in the flow of gas the accompanying increase in negative pressure on the suction side of the metering orifice will correspondingly, through the instrumentalities just described, effect a further reduction of the water level in vessel 211; and likewise, if the flow of gas decreases, by reason of a reduction of negative pressure in the pipe 224, the flow of water over the weir 215 will cease until the water from the line 207 has filled the U-tube leg or vessel 211 to a proportionally higher water level—whereupon the flow of water over the weir 215 will again just equal the flow of water into the vessel 211, equilibrium being thus reestablished. Hence, it will be seen that variations in flow of chlorine are automatically accompanied or registered by variations in the height of the water line in the vessel 211.

For control of a recording instrument or the like from the pressure-responsive means just described, an electrical transmitting system may conveniently be employed, for example, a system of the sort illustrated in Fig. 2. To that end, a transmitting inductor is provided, having a rotor 269 and a stator 274, and it will now be appreciated that the connections from these devices, designated A, B, C and D in Fig. 3, may be connected at correspondingly identified points in the circuit of Fig. 2, in lieu of the inductor elements 169 and 174, there shown. To operate the rotor 269 a ball float 220 is carried by the water in the chamber 211, and is fastened to a sheave 221 by a flexible wire 223, or by other suitable arrangement, so that rise and fall of the float (in response to variations of the water level 211a) will be translated into corresponding rotative displacement of the sheave 221, which in turn is mechanically connected to rotate the rotor 269 accordingly. A counter-weight 222 may also be provided, for counterbalancing the weight of the float to a certain extent, and also for facilitating clockwise rotation of the sheave 221 upon upward displacement of the float by a rise of the water level.

Two sets of contacts 218, 219 are connected in parallel across the rotor winding 269, and are provided with a contact operating member mechanically shiftable to close one or another of the contacts by rise or fall of the float member 205a carried by the water in the chamber 205. It will be understood that the arrangement of this float member and of the contacts, as well as of a water seal for the float member, may advantageously be similar to the elements 144—147 shown in Fig. 2 for there operating the contacts 151 and 152. In other words, since the pressure above the water in chamber 205 is the same as that within the bell jar 204, a definite increase of negative pressure in the bell jar (as may be occasioned by an exhaustion of the chlorine supply) will cause the float 205a to rise and close the contacts 219. Similarly, upon a decrease of the negative pressure in the bell jar (as may be occasioned by other abnormal condition in the chlorinator, as previously explained in connection with Figs. 1 and 2), the float 205a will drop and close the contacts 218. In either case, the rotor 269 will be short circuited and a positive and immediate indication, conveniently by movement of the recorder arm to sub-zero position, will be afforded at the recorder respecting the abnormal condition of the chlorinator—in the same manner as described in connection with Fig. 2.

The arrangement of Fig. 3 also includes means whereby temperature variations at the chlorinator will be so compensated that the recording device will afford a proper and accurate indication of the actual weight of chlorine being fed. As hereinabove mentioned, the quantity of gas flowing through an orifice with a given pressure differential will vary with the temperature of the gas; that is, as the temperature increases the specific gravity of the gas is reduced, and vice versa. For example, in the case of chlorine gas being handled in a chlorinator, it has been determined that the actual weight of the chlorine traversing the metering orifice 233 will increase or decrease about one percent for every 10° variation in temperature (10° F.) within the working temperature range of a vacuum chlorinator. Thus if the metering orifice 233 is calibrated with gas at a temperature of 70° F., it will actually pass two percent less of the gas at 90° F. than would be indicated with the differential pressure existing across the orifice; and similarly at 40° F. the flow of gas will be three percent greater than the amount indicated, i. e., than the amount which would be passed by the same difference of pressure at 70° F.

To afford correction in these respects the system of Fig. 3 includes a thermally-responsive resistance wire 225 disposed within the bell jar 204, and connected in series with another resistor, such as the potentiometer 226, across the terminals of the rotor 269—the controlling voltage output from the rotor being taken across the terminals of the resistor 226, as shown, and being further proportioned by another voltage divider such as the potentiometer 183 in Fig. 2, for opposition to the voltage of the receiving rotor (as derived from its "spread control" potentiometer 184, shown in Fig. 2). The resistor 225 is conveniently made of nickel or other wire having a temperature coefficient of resistivity which is relatively high, and is so placed within the bell jar, as will now be understood, that it readily assumes the same temperature as the gas therein; in consequence, the resistance of the wire 225 varies directly with the changes of temperature. The series potentiometer 226 is advantageously made of wire having a negligible temperature coefficient of resistivity (such as Manganin or Constantin wire) and may be, as shown, initially adjustable or susceptible of calibration, for cooperation with adjustment of the secondary proportioning potentiometer 183 of Fig. 2 (if the latter is provided), so as to obtain with the latter (or independently) an accurate compensation for temperature variations.

That is, if the temperature in the bell jar increases, the resistance of the wire 225 will increase and the output rotor voltage across the resistor 226 will be accordingly diminished, so as to indicate the actual corresponding reduction in chlorine flow, although there may, at the same time, be no change in the pressure difference across the orifice 233 to vary the voltage by rotation of the rotor itself. A decrease of temperature within the bell jar will have a similar but opposite effect, and it will thus be seen that the ultimate indicator or recorder reading, so corrected, is directly proportional to the gravimetric flow of gas through the orifice 233, and affords a true measurement of the actual chlorine flow at all times.

Although other devices may be used in some cases, such as a rheostat mechanically adjusted by a bi-metallic element, Figs. 4, 4A and 4B illustrate a suitable and presently preferred construction of temperature-compensating unit for use in systems of the character herein described, as, for example, to provide the temperature-responsive wire 225, shown within the bell jar of the chlorinator in Fig. 3.

The illustrated device includes a plurality of sheets of insulating material, such as mica cards 301, each provided with a single layer winding of wire 301a, having the desired large temperature coefficient of resistivity. A particularly suitable wire for this purpose has been found to be the wire commercially known and available as "Hytemco," produced by the Driver Harris Company of Harrison, New Jersey, this being a wire which has a very high specific resistance and has a temperature coefficient of resistivity of 0.0022° F. To enhance the radiation properties the several cards are spaced from each other; and the assembly of them is conveniently sealed in a glass envelope 302, to protect the wire from the corrosive fumes of the chlorine gas. To provide maximum thermal conductivity the envelope may contain a suitable gas such as hydrogen or helium.

For attachment at a suitably lipped mouth at the top of the bell jar, a split annular clamp 304 is provided, having circumferentially spaced clamping screws 306, and associated rubber bushings and gaskets 307, which are clamped down by the screws to afford a gas-tight supporting fixture on the mouth of the bell jar. The glass neck or stem of the envelope 302 passes through the central bushed aperture of this fixture, and is clamped to the fixture by a further annular clamping member 308 and clamping bolts, as shown—the arrangement being such that when the nuts 310 are tightened up on the bolts, the member 308 compresses an annular rubber gasket 309 against both the stem of the envelope 302 and the bushing 307, to effect a gas tight support. It will be understood that the terminal wires from the resistor may be carried out through a glass press 303 in the end of the envelope stem, to an insulating terminal block 311, whence connecting wires 312 may be run; and the exposed parts of the assembly are advantageously protected by a suitable cover 313 of Bakelite or like material.

The arrangement just described provides a rugged and efficient structure whereby a resistance wire having a high temperature coefficient of resistivity is thermally associated with the gas in the bell jar, so as to provide temperature compensation, as in the manner described, for example, in connection with Fig. 3.

Fig. 5 illustrates a further modified system of the invention, including hydraulically operated arrangements for converting relatively small negative pressure variations, such as occur in the control and operation of the chlorinator or like device, into proportional positive pressure variations which may be of much greater magnitude—whereby rugged, accurate and relatively inexpensive pressure gauges and recorders may be operated. The illustrated system also includes modified means for effective insulation of the chlorine or like gas from the measuring devices and their vicinity—i. e., to prevent any diffusion of chlorine into the measuring chambers or the room in which the apparatus is installed.

In general, a number of the elements included in the system of Fig. 5 are similar to certain elements of the structure shown in Fig. 3, and except as otherwise hereinafter stated, are adapted to function in similar fashion. The structure and relation of the instrumentalities of Fig. 5 may conveniently be explained in connection with their mode of operation. Thus, under normal conditions and assuming that the gas flow through the diagrammatically represented chlorinator 501 is zero, a predetermined normal pressure difference, equal, say, to two inches of water, exists between the inside and outside of the bell jar 502, so that, in the manner previously explained, the level of the water line 503 is correspondingly above that of the water 504 in the exposed portions of the chlorinator tray 505.

The negative pressure within the bell jar is transmitted through the line 506 to a chamber 507, which contains water in communication, through a suitable U-tube, with a constant level box 508a having a weir 508 and an associated constant-flow water supply 523; the chamber 507, U-tube, constant level box 508a, weir 508 and water supply 523, being similar, for instance, to the corresponding elements 205, 213, 208, 210 and 207, 209, in Fig. 3. It will, therefore, be seen that the water in the chamber 507 assumes a level which, under the conditions stated, is two inches above the edge of the weir 508.

From the suction side of the metering orifice 521 of the chlorinator (i. e., conveniently from the suction line 509 at a point above the level of the aspirator or injector, not shown in this figure), a line 510 extends to a chamber 512, which contains water in communication through another U-tube, with a float box or vessel 511, one leg of the U-tube being the pipe 522 which extends down from the bottom of the chamber 512, and the other leg being conveniently the box 511 (disposed adjacent to the constant level box 508a from which water flows over the weir 508, to fill the U-tube). As will now be understood, these elements are generally similar to the corresponding chamber, U-tube and float box provided by the elements 202, 212 and 211, in Fig. 3. Under the conditions assumed above and with other parts arranged as hereinafter described, the water 516 in the chamber 512 will assume a level two inches above the edge of the weir 508, and when the chlorine flow is zero, the U-tube leg 511 will tend to fill to a level flush with the top of the weir.

A float 514 is carried by the water in chamber 512 and carries a downwardly depending rod 515 connected to operate a valve 517 in the bottom of the last-mentioned U-tube, so that if the water level in the chamber 512 attempts to exceed its normal two inch head, the valve 517 is lifted from its seat and the excess water flows out to waste through the pipe 518. As in the case of the box 208 in Fig. 3, the constant level box 508a has an overflow pipe 519, which may conveniently be connected through a pipe 520, as here shown, to the waste outlet 518. It will be seen that the level of the water in the chamber 512 cannot exceed a two inch height above the weir 508 (as previously stated) unless the valve 517 becomes clogged, and in the latter event further rise of the water in both the chamber 512 and the combined vessel provided by float box 511 and constant level box 508a will be interrupted when the water in that vessel (508a—511) reaches the edge of the overflow pipe 519— further quantities of water being carried off in the latter.

Let it now be assumed that the negative pressure in the suction line 509 is increased, so as to provide a flow of chlorine gas in the chlorinator as previously explained. In consequence, the negative pressure in the chamber 512 is similarly increased and the water level 513 in the U-tube leg 511 is lowered a corresponding distance—the surplus water being run to waste by the operation of the valve 517, which opens to the extent necessary for such purpose whenever and to the extent that the float 514 attempts to rise with the increase in negative pressure. Generally as in the case of Fig. 3, the water level in the U-tube leg or float box 511, varies vertically with variations in negative pressure on the suction side of the chlorinator metering orifice, and thus in correspondence with variations in flow of chlorine. For example, upon a decrease of vacuum in the lines 509 and 510, representing a decrease in chlorine flow, the water level in the box 512 and tube 522 tends to drop, so that the float 514 closes the valve 517; and the incoming water from the line 523, through the box 508a and over the weir 508, fills the U-tube leg 511 until equilibrium is again established and there is a normal trickle of water to waste through the pipe 518. Thus the decrease of negative pressure in the suction line 509 produces a corresponding rise of the water level in the float box 511.

A secondary chamber or vessel 524 is associated with the float box 511, and conveniently comprises, as shown, a tube extending up within the latter, from the bottom thereof. Although such construction is at present preferred, it will be understood that in some cases, the supplemental control vessel 524 may be otherwise disposed relative to the vessel 511. In the arrangement shown, the vessel 524, advantageously made of glass, nickel, or other suitable material, is threaded at its lower end into a corresponding opening in the bottom of the vessel 511, whereby the tube 524 may be vertically adjusted, and may be secured in any adjusted position by tightening the lock nut 525. The tube 524 is filled with mercury 526 or other suitable liquid, preferably a liquid having a relatively low viscosity and a relatively high specific gravity, and a pet cock 527 or like device is provided at the bottom of the tube to afford vertical adjustment of the level of the liquid.

A hollow annular float 528, which may be made of hard rubber, is carried by the water in the vessel 511, and conveniently surrounds the tube 524. A pair of upright supporting posts 529 are carried by the float 528 and these in turn carry a tube 530 which extends downwardly into the liquid in vessel 524; the tube 530 being preferably of fine bore and very thin wall section, and made, say, of nickel. Means may be provided to guide the tube 530 for vertical movement: for example, a relatively loose-fitting or otherwise substantially friction-free bearing 531 adjacent to the mouth of the tubular vessel 524; or in some cases, suitable counterweight means (not shown) may be included in addition to, or in lieu of, the described bearing, for like purpose.

The lower end of the tube 530 is open, and is normally below the level of the mercury in the vessel 524, i. e., during periods of chlorine flow; and it will now be seen that the distance to which the lower end of the tube 530 is thus submerged will vary directly in accordance with variation of the level of water in the vessel 511. A convenient adjustment of the relation intermediate the level of mercury in tube 524, and the position of the tube 530 with respect to its floating support assembly 528—529, is such that at times of zero chlorine flow, when the water in the vessel 511 is flush with the top edge of the weir 506, the lower end of the tube 530 is just above the surface of the liquid 526.

By means of an electrically operated air pump 532 (energized from a suitable power line 532a) or air compressor or other source of gas under pressure, a positive pressure is normally built up and maintained in a control line 533 extending from the pump; the pressure preferably being substantially higher, in inches of mercury, than the maximum submergence of the control tube 530. The line 533 is connected, with rubber tubing 535 or other flexible conduit, to the upper end of the control tube 530, and the line 533 further extends to a pressure indicating device 536, which may be a rugged type of positive pressure recording gauge, hitherto available for other purposes. The line 533, at a point adjacent to the source 532 of air under pressure, preferably includes a small flow-restricting orifice 534 whereby the pressure transmitted in the line 533 can be quickly relieved by even a small flow therefrom, e. g., a small flow through the relatively fine bore tubing 530.

It will now be understood that the gauge 536 can be directly calibrated in terms of the flow of chlorine gas through the chlorinator 501. That is, as the chlorine flow varies in accordance with variations of negative pressure on the suction side of the metering orifice 521, the water level in the vessel 511 is correspondingly varied in height, and through the instrumentality of the float 528, the distance to which the control tube 530 is submerged in the mercury 526, is similarly adjusted. The pressure in line 533 is thereby varied in proportion; as the lower end of the tube 530 is raised, the pressure in the line 533 is correspondingly relieved or reduced, and as the lower end of the tube is depressed, the pressure of air in the line 533 is permitted to build up (from the source 532) to a correspondingly increased value.

Thus the pressure in the line 533, conveniently measured in inches of mercury, and always determined by the distance between the lower end of the tube 530 and the upper surface of the mercury in the vessel 526 (independently, even, of considerable variation at the source 532), is directly and accurately proportioned to variations of negative pressure in the line 519—and hence the gauge 536 thus accurately records or otherwise meters the feed of chlorine gas by the chlorinator. It will now be seen that the system not only affords an effective arrangement for operating a pressure type gauge with complete insulation of the latter from the corrosive fumes of chlorine, but also provides, where the liquid in the secondary vessel 524 is mercury or other liquid substantially heavier than the liquid, e. g., water, in the control vessel 511, a definite and powerful amplifying action. Thus where mercury is employed in the vessel 524, the negative pressure variations in the chlorinator are not only translated into variations of positive pressure, but are multiplied approximately 13.6 times, inasmuch as the specific gravity of mercury is 13.6 times that of water. Or in other words, if the negative pressure on the suction side of the metering orifice 521 varies by one inch of water, the resultant pressure variation in the gauge-controlling line 533 is one inch of mercury, equivalent to 13.6 inches of water.

At least in theory, and even though the amount of air in the tube 530 is very small and the wall of the tube is very thin, a slight error may in some cases occur in the gauge reading, by reason of displacement of mercury as the tube is moved, say, from a high position to a low (more submerged) position. If desirable, this error may be entirely compensated by tapering the vessel 524 to a very slight amount, outwardly toward its upper end. In most cases, however, the increased buoyancy provided by the air within the control tube 530 (as the latter is depressed) tends to lift the float 528 very slightly, and thus maintain the depth of the tube 530, below the mercury surface, in true correspondence with the level of the water in the vessel 511. Compensation is therefore, in effect, automatically afforded for what might otherwise be a slightly erroneous relation between the position of the float 528 and the surface of the mercury 526, occasioned by displacement of the mercury.

In the chamber 507, a float 538, similar to float 205a in Fig. 3, is provided, and carries a downwardly projecting rod (through a water-sealed opening, also as in Fig. 3) having a pair of spaced collars for operation of levers 539 and 540 to open an air relief valve 537, in the same manner as the valve 54 of Fig. 1. That is, upon exhaustion of the chlorine supply, the increase of vacuum in the chlorinator bell jar raises the water level in the chamber 507, whereby the instrumentalities illustrated, being generally similar in structure and operation to the instrumentalities in Fig. 1 for operating valve 54, will open the valve 537. By virtue of the flow-restricting orifice 534, even a very slight opening of valve 537 is sufficient to relieve the pressure in line 533, whereupon the gauge 536 moves to zero position. Similarly, upon other abnormal conditions in the chlorinator which would reduce the vacuum in the bell jar 502, the water level in the chamber 507 will drop, and the valve 537 be similarly opened. In either situation, a prompt and positive return of the recorder arm to zero is obtained, indicating the abnormal condition of the chlorinator.

Fig. 6 illustrates another form of the invention, which, like the arrangement of Fig. 5, may be used to operate a positive pressure type of recording gauge, and which is similarly characterized by many of the advantages mentioned in connection with Fig. 5. The arrangement of Fig. 6, however, includes a modified form of pressure translating device, which is preferable in a number of cases, and also includes an air relief trap in lieu, for example, of mechanical valves such as are illustrated in Figs. 1 and 5, for returning the indicating instrument to a predetermined low position upon exhaustion of chlorine supply.

In Fig. 6, a pressure translating instrument generally designated 600 is adapted to convert the relatively small variations of negative pressure derived from the chlorinator 601, into variations of positive pressure, as for controlling the recording gauge 604, which may be of the same type as shown at 536 in Fig. 5. The translating device 600 (conveniently illustrated in section of a perspective view) comprises a pair of concentric cylinders 605, 606, the latter being arranged within the former and the two being clamped between a pair of circular end plates 607, 608, by means of a plurality of circumferentially spaced bolts 609. The central cylinder 606, near its lower extremity, is pierced with a plurality of holes 610, so that when the structure is partially filled with liquid (as in use), it provides a U-tube of which one leg is the central cylindrical compartment, and the other leg is the outer annular compartment bounded by the cylinder 605.

A circular float 612 of chlorine-resistant material is carried by the liquid within the central chamber, and is adapted to adjust a depending rod 613 vertically in accordance with the level of the liquid; a liquid seal for the connection of the rod to the float being provided by the float-carried tube 614 and an inner tube 615 extending up from the bottom of the lower cover plate 608. An annular float 616, similarly made of chlorine-resistant material, is carried by the liquid in the outer annular chamber, and vertical displacements of this float are communicated to a pair of rods 617, 617, through the liquid seals provided by the concentric silver tubes 618 and 619 associated with each of the rods. It will be understood that the arrangements for displacing the rods 613, 617, 617 may, as just described, be conveniently similar to like liquid-sealed arrangements shown in preceding figures for similar operation of control rods.

A funnel and valve 620 may be provided for introducing or adding liquid, as necessary, through the upper cover plate 607, and an outlet valve 621 in the lower cover plate permits ready adjustment of the level of the liquid in the U-tube chambers. It will be understood that in operation, the device is partially filled with liquid, e. g., water, carbon tetrachloride, or other liquid suitable for use in contact with the gas under measurement.

The upper parts of the two U-tube chambers are connected to opposite sides of the metering orifice in the chlorinator, i. e., across the device wherein exists the pressure difference that is to be measured. Thus, for example, the outer chamber is connected by the line 623 to the suction line 648 from the metering orifice 602 (as in the case of line 42 in Fig. 1), and the inner chamber is connected by a line 622 to the space within the bell jar 645 (as in the case of the line 206 in Fig. 3).

The rods 617 of the outer chamber in the translating device, and the rod 613 of the inner chamber of the latter, are connected so that their relative displacements are converted into relative displacements of a pressure line control tube within a body of mercury or other liquid. Thus, for example, the lower ends of the rods 617 are connected to support a frame element into which the upper, open end of a tubular vessel 626 is threaded. Vertical adjustment of the tube 626 relative to the rods 617 may be effected with the described threaded connection, and the adjusted position may be held by tightening the lock nut 630. The rod 613, actuated by the float in the central chamber or U-tube leg, is connected for vertical displacement of a control tube 624, extending down into a body of liquid 625 in the vessel 626.

It will be understood that as in the case of Fig. 5, i. e., when it is desired to operate a relatively rugged type of pressure gauge, the liquid 625 is preferably one, such as mercury, having a high specific gravity in comparison with the liquid, e. g., water, in the controlling pressure-sensitive device. It will also be appreciated that the air control tube 624 may be a fine bore, thin walled tube, as explained in connection with Fig. 5; the tube 624 opening, under normal conditions of chlorine flow, below the liquid 625 in the vessel 626.

Also as in the case of Fig. 5, an electrically operated air pump or compressor 626 energized from a line 626a, may be arranged to introduce a relatively substantial pressure in a control line 628, through a flow-restricting orifice 627 which enhances the sensitivity of control, as explained in connection with the similar orifice 534 of Fig. 5. The pressure line 628 extends to the recording gauge 604, and also through a suitable flexible tubing or like connection 629 to the interior of the control tube 624.

It will now be seen that when there is no gas flow through the chlorinator, the same pressure will exist in both of the pipes 622, 623, so that the floats 616 and 612 will both assume the same level. However, when gas is flowing through the metering orifice of the chlorinator, the negative pressure on the suction side is greater than that above the water in the bell jar (the chlorine flow being proportional to the difference of pressures), and in consequence the liquid level in the outer chamber of the translating device (wherein the vacuum is now greater than in the central chamber) will be higher than that in the central chamber, to an extent directly proportional to the difference of pressure across the metering orifice. The pressure control tube 624 will be depressed accordingly in the mercury 625, and a corresponding variation of pressure in the line 628 will result; it being understood that under conditions of zero flow, the resulting high position of tube 624 relieves the pressure in the line 628 to a predetermined large extent to afford a zero position of the recorder 604.

By the described instrumentalities, the variations of chlorine flow are therefore accurately registered on the gauge 604—for which amplified pressure variations may be provided, as in Fig. 5. That is, the controlling variations of pressure difference (which produce the variations of chlorine flow) effect corresponding variations of positional difference between the rod 613 and the rods 617, which may in turn, through the instrumentality of the control tube 624 and associated elements (when a heavy liquid is used in vessel 626), produce proportional variations of a greatly amplified or multiplied nature, in the positive pressure line 628.

It should especially be noted that the form of differential converter or translating device illustrated in Fig. 6 is at all times directly responsive to the actual pressure difference across the metering orifice 602 of the chlorinator. Structure of this character obviates any need for correlating the height of a liquid level above a weir— such as (in Fig. 5) the water level in chamber 507 above the weir 508—with the height of the water level in the bell jar 645; i. e., there is no need to reproduce, in the translating instrument, the water level difference in the chlorinator tray between the interior and exterior of the bell jar. Furthermore, partial evaporation of the liquid within the inner and outer chambers of the converting device 600, will have no effect on the accuracy of the control or of the recorder readings, since the relative positions of the floats 612 and 616 will always be the same for a given differential across the metering orifice 602.

The arrangement of Fig. 6 also includes an air relief trap generally designated 603. This device includes a vacuum chamber 631 consisting of a glass cylinder 632 clamped between two hard rubber disks or plates 633, 634, peripherally spaced clamping bolts 635 being provided to afford a vacuum tight joint. A second vacuum chamber, conveniently disposed below the chamber 631, may likewise be comprised by a glass cylinder clamped between hard rubber end plates 640, 641, with similarly peripherally spaced clamping bolts 642. The lower chamber 639 is partially filled with a suitable liquid such as water or carbon tetrachloride, and is provided with a central cylindrical partition 636 (which may also be of glass) extending down from an aperture in the upper cover plate 641, into the liquid.

A tube 637 extends down from the interior of the upper vacuum chamber 631, through its lower plate 634, into the cylindrical center section 636 of the lower vacuum chamber. The upper vacuum chamber is connected, through lines 623a and 623, to the suction line from the metering orifice 602, while the space above the liquid in the outer or sealed portion of the lower chamber 639 is connected, through the line 644, to the interior of the bell jar 645 (i. e., the other side of the metering orifice); it being understood that the upper end of the cylindrical partition 636 is sealed to the cover plate 641 so that the level of liquid in the outer part of the lower chamber is kept at such level above that in the open central section as corresponds to the negative pressure under the bell jar 645—a negative pressure, say, of two inches.

It will now be seen that the negative pressure normally existing in the line 623 will cause liquid from the lower chamber to be drawn up in the tube 637 to a distance corresponding to such negative pressure. Conveniently, the tube 637 is of such length that the liquid 638 will never be drawn all the way up into the chamber 631 during normal operation; i. e., of such length as could be filled only by a vacuum substantially in excess of the maximum normally attained in the chlorinator metering tube.

If now, for instance, the chlorine supply becomes exhausted, and the vacuum within the bell jar 645 accordingly increases beyond its assumed normal extent of two inches of water, the liquid in the outer part of chamber 639 will rise and the liquid in the inner part 636 will fall (i. e., the divergence of levels will be correspondingly increased) so as to expose the lower end of the tube 637 to the atmosphere. In that event, any liquid remaining in the tube 637 is either drawn up into the chamber 631 or else caused to fall back into the chamber 636, and in either case air is afforded access to the vacuum line 623. The line 623 thus attaining atmospheric pressure, the vacuum is similarly relieved in the outer chamber 605 of the converting device 600. In consequence, the level of liquid in the chamber 605 drops sufficiently, relative to the level in the central chamber of the device 600, as to bring the lower end of the control tube 624 up entirely out of the mercury 625, thereby immediately relieving the air pressure in the gauge control line 628 and displacing the gauge pointer or arm to a zero or sub-zero position (depending on the original adjustment of vessel 626 relative to the rods 617).

A baffle plate 646 is preferably included in the chamber 631 of the relief trap, above and across the opening of the tube 637, to prevent any possibility of the liquid 638 being splashed or sucked into the line 623a. It is also desirable to provide a flow-restricting orifice 647 in the line 623, intermediate the chlorinator metering tube and the controlled instrumentalities shown, so as to prevent excessive flow of air back into the metering tube under such circumstances as are attendant upon exhaustion of chlorine supply. At the same time, the orifice 647 is of further advantage in reducing the effect on the translating device 600, of any pulsations that may exist in the chlorinator.

It will now be appreciated, as indicated hereinabove, that air relief traps of the general type designated 603 in Fig. 6 may be used, in a number of cases, instead of other means illustrated in preceding figures for attainment of the same general purpose. Thus for example, to indicate chlorine exhaustion in Fig. 5, the pipe 644 of the relief trap 603 could be connected to the line 596, and the line 623a of the relief trap could be connected to the line 510 in lieu of that to line 583 from valve 527; and similar substitution could be made in Fig. 1.

It will be understood that in the various instrumentalities shown in Fig. 6, gasket means, such as the gaskets 650, 651, are preferably included, to afford a vacuum tight seal in each of the vacuum chambers; and in the lower chamber 639 of the air relief trap, a valved drain line 643 may be provided, for accurate adjustment of the liquid level relative to the lower end of the tube 637—i. e., to provide for the described relief operation upon any desired departure of the chlorinator bell jar vacuum from its normal level.

Figure 7 illustrates an arrangement, hydraulically controlled, whereby the flows of two chlorinators may be totalized, and the resulting summarization recorded or otherwise indicated on a single gauge 701, which may be, for instance, a positive pressure type of recording gauge. In view of the preceding description, the illustration of Fig. 7 is conveniently simplified and various instrumentalities, including chlorinators, associated relief valves, and the like, are omitted; it being understood that these devices may conveniently be such as are shown in preceding figures.

The pressure translating or converting device of Fig. 7, and there illustrated in section of a diagrammatic perspective view, includes a pair of chambers 702, 703, each sealed at its top and each having its upper part in communication with the metering tube of a chlorinator. That is, the chamber 702 is connected by a line 704 to the suction side of the metering orifice of one chlorinator (not shown) and may also have a branch line 704a extending to a relief valve (not shown) which may for instance be an air-introducing valve such as valve 54 of Fig. 1, arranged for operation (as in Fig. 1) upon predetermined vertical displacement of a float within the chlorinator bell jar. Similarly, the chamber 703 is connected, by a line 705, to the suction side of the metering orifice of another chlorinator (not shown) and likewise has a branch line 705a which may extend to a like relief valve (not shown) for the last-mentioned chlorinator. It will be appreciated that in some cases, other means than the specific type of relief valve illustrated in Fig. 1 can be employed; for example, an air relief trap such as is illustrated in Fig. 6.

The chambers 702 and 703 are conveniently disposed on either side of a central tank or chamber 706, which may be open to the atmosphere at the top, and the walls separating the thus adjacent chambers are provided with suitable openings at the bottom, viz., opening 707 intermediate the chamber 702 and the central tank 706, and opening 708 intermediate the chamber 703 and the central tank, so as to provide free communication among the chambers for the water or other suitable liquid with which the apparatus is partially filled. A float 709 is carried by the liquid in the central tank, and through a liquid-sealed connection comprising the concentric tubes 710 and 711 (conveniently arranged as hereinbefore described with respect to such devices in preceding figures) is adapted to reciprocate a rod 712 vertically in accordance with changes in level of the liquid in the central tank.

The rod 712 is in turn connected for vertical adjustment of a small control tube 713 which extends into a vessel 714, so as to vary the pressure set up by a suitable air pump 715 in the line 716. The line 716 is connected to the tube 713 by a suitable flexing tube 717 and at its other end extends to the recording gauge 701. It will now be appreciated that the construction and arrangement of the parts just described for varying the pressure in line 716 (i. e., elements 713 to 717 inclusive) may conveniently be as described in connection with like instrumentalities shown in Figs. 5 and 6. Similarly, if it is desired to obtain an amplification or multiplication of pressure variation, the liquid 718 in the control vessel 714 may be one of high specific gravity, e. g., mercury; and to provide prompt and positive response upon relatively small vertical adjustments of the tube 713, a flow restricting orifice 719 is advantageously provided intermediate the pump 715 and the controlled pressure line 716. As in previous figures, the pump 715 may include suitable actuating means such as an electric motor (not shown) energized from a source of current 720.

In order to enhance the accuracy of totalizing operation of the converting device, means are provided to compensate for the fact that the negative pressures in the chlorinator metering tubes vary non-linearly with, e. g., ordinarily as the square of, the gas flow through the metering orifices. To that end, for example, each of the chambers 702 and 703 may be deformed, as with a non-perpendicular configuration of one or more of its vertical walls, so that the actual amount of liquid withdrawn by each of the side chambers from the central chamber 706 is directly proportional to the flow through the metering orifice of the associated chlorinator, for any particular negative head. Thus the rear walls 722 and 723 of the respective chambers 702 and 703 may each have a downwardly and outwardly flaring configuration as shown, and comprising, for instance, a surface generated by a horizontal line following a parabolic or other compensating slope (readily determinable by mathematics, as will now be understood, so as to proportion the volume of liquid in accordance with the specific quadratic or other function to be translated linearly), at least throughout the entire range which may be traversed by the surface of the liquid in each chamber during all working operations of the device.

In other words, if each chamber were of uniform vertical dimension throughout, the amount of liquid displaced from the central tank by a negative pressure corresponding to, say, a flow of ten pounds of gas (per 24 hours) would be very much less than one-half of the amount displaced by a flow of twenty pounds of gas. Inasmuch as the position of the float 709 is controlled by the summarized withdrawal of liquid into the associated control chambers 702 and 703, it will therefore be seen that if the controlling chlorinators each had a maximum range, for example, of one hundred pounds of gas per 24 hours, and one of them were feeding at the rate of fifty pounds of gas and the other at the rate of ten pounds of gas, the total vertical displacement of the float 709 would be considerably less (with the chambers 702 and 703 of uniform vertical dimension) than a displacement which is linearly proportional to the total flow of sixty pounds of gas per 24 hours. In consequence, by shaping the chambers 702 and 703 in the manner described, to extract the square root, so to speak, of the negative heads produced across the orifices in the chlorinators, an accurate and practical totalization of the respective gas flows of the latter may be obtained in a single instrument of the character illustrated.

The operation of the apparatus shown in Fig. 7 should now be apparent from what has been said; that is, the level of liquid in the central tank 706 is varied in accordance with the withdrawal of liquid therefrom by both the adjacent tanks 702 and 703, and in accordance with the negative pressures in the upper parts of the latter. The rod 712 is therefore adjusted in accordance with a totalization of the respective negative pressures, and by virtue of the construction illustrated, in true linear proportion to the sum of the gas flows of the two associated chlorinators. By means of the resulting vertical displacements of the control tube 713, i. e., variations in the extent to which the lower end is submerged in the mercury or other liquid 718, the pressure gauge 701 affords a combined indication of the flow of chlorine through the two chlorinators together.

If desired, the position of the control tube 713 with respect to the level of liquid 718 in the vessel 714 may be initially so adjusted, as will now be understood from the description of preceding figures, that upon operation of both of the air relief valves (not shown) connected to lines 704a and 705a, the resulting upward displacement of the float 709 will be sufficient to move the tube 713 out of liquid 718, and afford an immediate low or "alarm" reading of the gauge 701. If instead of the relief valves being inserted in lines 704 and 705, they are both inserted in the pressure line 716 (for example, like the valve 537 in the line 533 of Fig. 5), operation of either valve will then afford a low or "alarm" reading of the gauge 701.

Figure 8 illustrates a further recording or indicating system, wherein, as in the case of Fig. 7, additive measurement of the flows of a plurality of chlorinators or like devices may be achieved; but instead of hydraulic translating and totalizing means, an electrical system is shown in Fig. 8.

For convenience, the figure illustrates a system controlled by a pair of chlorinators, but it will be understood that more than two chlorinators may be similarly controlled and totalized; indeed the same is true of the system of Fig. 7, as it will be readily appreciated that more than the two control chambers 702 and 703 can easily be associated, in similar fashion, with the central chamber 706. Referring to Fig. 8, each of the chlorinators may conveniently be arranged to control an electrical transmitting instrument, for example by instrumentalities of the character illustrated in Fig. 3 and consequently not repeated in detail. Thus corresponding to the respective chlorinators "A" and "B," float chambers 801 and 802 are provided, for vertical adjustment of floats 807 and 808 to rotate correspondingly, the pulleys 803 and 804—these parts being respectively constructed, and controlled from the chlorinators, as in the manner of Fig. 3.

In order that chlorinator "A" may adjust the rotor 811 of one electrical transmitting inductor, and chlorinator "B" may adjust the rotor 812 of another transmitting inductor, the corresponding pulleys or sheaves 803, 804 are respectively mechanically connected to the rotors. However, in order to provide a uniform accuracy of totalization, compensating means are conveniently included to convert the pulley displacement (which corresponds to the negative pressure variations and thus non-linearly to the gas flow, as generally explained in connection with Fig. 7) into electrical variations proportional linearly to the changes in gas flow. Although other means may be employed for such extraction, so to speak, of square root (for example, as disclosed in my aforesaid Patent No. 2,336,994), Figure 8 illustrates a simple and suitable arrangement comprising the cams 805 and 806 respectively interposed in the mechanical connections for rotation of the rotors 811 and 812.

The system may also include, as more specifically disclosed in connection with Fig. 3, means to correct the ultimate reading for variations in the actual weight of gas flowing, with changes in temperature. To that end, thermally-variable resistors 813 and 814 are provided in the bell jars of the respective chlorinators "A" and "B," and are respectively connected in series with other resistors 815 and 817 across the terminals of the rotors 811 and 812 respectively; whereby as explained in connection with Fig. 3, the ultimate output of the transmitting rotors 811 and 812, as further and secondarily proportioned by their respective output potentiometers 816 and 818, is each directly proportional, in voltage, to the actual weight of chlorine gas being fed by the associated chlorinator.

Under the control of floats 819 and 820 respectively (each corresponding to the float 205a in Fig. 3) suitable contacts are adapted to effect a short circuit across the respective rotor outputs, upon exhaustion of chlorine gas or other abnormal condition in the associated chlorinator, whereby upon such short circuit of any rotor output, the system continues to function with the exhausted chlorinator counted as having zero flow, and whereby upon short circuit of all transmitting rotor outputs a predetermined—say, complete zero—reading of the ultimate indicating instrument may be obtained, for appropriate alarm operation (if desired). It will be understood that the structure and function of these contacts and their associated controlling and controlled instrumentalities may be as described in connection with Fig. 3 and are therefore not here repeated in detail.

If, as may sometimes be the case, a special zero or "alarm" reading is desired upon failure of any chlorinator, all of the short-circuiting contacts may be connected in parallel across the joint output of the transmitting rotors—e. g., between the upper end of resistor 815 and the lower end of resistor 817 in Fig. 8, instead of the contact connections there shown. On the other hand, with the illustrated arrangement, it will now be appreciated that in order to operate an alarm bell or the like upon abnormal condition of any individual chlorinator, each illustrated set of contacts may have supplementary contacts closeable therewith (but insulated therefrom) for closing an alarm circuit such as the circuit of bell 57 in Fig. 1.

The electrical system is also provided with a receiving inductor having a rotor 821, and the output of rotor 821, across its "spread control" potentiometer 822, is connected in series opposition to the sum of the outputs of the transmitting rotors 811 and 812, as obtained across their output potentiometers 816 and 818. That is, the outputs of the transmitting rotors are thus so connected, in series, as to be additive in voltage and phase, but the two together are connected so that their total voltage is in opposition to that of rotor 821 in a series circuit of all of them with the input of the amplifier diagrammatically illustrated at 823.

In other respects, the electrical control and indicating circuit may conveniently be the same as illustrated in Fig. 2. That is, the stators 824, 825 and 826 respectively associated with the receiving inductor rotor 821 and the transmitting inductor rotors 811 and 812, are all connected in series with a suitable alternating current line 827; and upon displacement of either or both of the transmitting rotors 811 or 812, a voltage unbalance is created in the input circuit of the amplifier 823, whereupon a suitable servo-motor (not shown in detail) is controlled from the output of the amplifier to operate the receiving rotor 821 in such direction and to such extent as to restore balance in the amplifier input control circuit. At the same time, the servo-motor may conveniently be connected to adjust a suitable indicating instrument, to register the change in gas flow in accordance with which the original controlling displacements of the transmitting rotors were effected.

For simplicity of illustration, the servo-motor and recorder are diagrammatically illustrated by the box 830, the motor having its field energized from the A. C. line 827 and the mechanical connection to the receiving rotor 821 being indicated by the dotted line 831. It will be understood that as in the case of Fig. 2, the servo-motor may conveniently be of the shaded pole type, and the recorder may be of the sort illustrated in Figs. 9, 9A and 9B, and that for further and more detailed exposition of the structure and function of the electrical transmitting circuits, reference may conveniently be had to my aforesaid Patent No. 2,336,994 (wherein electrical circuits of this specific character are disclosed and claimed) and likewise to my aforesaid Patent No. 2,234,349 wherein are disclosed and claimed the arrangements of amplifier-controlled servo-motors that are at present preferred for such systems.

It will now be seen that the arrangement of Fig. 8 affords a simple and effective system for totalizing the flows of a plurality of chlorinators or the like, so that the combined result or sum is accurately represented by a single indication or record in the controlled instrument. At the same time, the system is such as may take full advantage of other features of the invention, as in correcting for variations of the specific gravity of the gas due to changes in temperature, and as in providing for a predetermined alarm or like control in the event of various abnormal conditions in any one of the chlorinators. Furthermore, the ultimate recording instrument may be remotely located from the transmitting devices, without difficulty; and where the electrical system is of the type shown, its advantageous features are fully utilized—including an avoidance of hunting, of electrical reaction, and of electrical effects due to line voltage or temperature changes.

It will be understood that where various elements hereinabove described are stated to be made of hard rubber, silver or glass, other suitable materials resistant to the corrosion of chlorine gas or to the action of water with which such gas is in contact, may be employed instead. In general, it is preferable that where the fluid handled by the feeding apparatus or the like is of a corrosive nature, such as chlorine, all parts (of the structures herein shown) which may come in contact with the corrosive agent or in contact with liquids in which such agent may dissolve in such fashion as to impart a corrosive nature thereto, should be of material resistant to the corrosion—e. g., for chlorine, hard rubber, glass, silver or the like.

Figs. 9, 9A and 9B illustrate an indicating instrument of the electrically operated type, which is suitable, for example, for embodiment in electrical chlorine-recording systems as hereinabove disclosed, and which is rugged, reliable and accurate. The device specifically illustrated is particularly adapted for use in systems of the sort shown in Fig. 8 (e. g., as for the device 830 in that figure), to indicate, record, and totalize the joint flows of two or more chlorinators; it being understood that the illustrated device may, however, be used for other indicating, recording or totalizing purposes, in connection with an electrical telemetric system—for instance in the systems of Figs. 2 and 3.

Figs. 9 and 9A are respectively front and rear elevations, while Fig. 9B is an exploded view. It will be appreciated that in Fig. 9B the dimensions and physical relationships of the various elements have been somewhat modified for clarity of illustration, and a number of structural details omitted or schematically indicated (as in the case of gear trains, structure of motors, inductor structure, and the like)—the purpose of Fig. 9B being chiefly to illustrate the functional relationship of certain major elements.

Referring to these figures, the device, which is conveniently enclosed in a casing 910, includes a suitable motor 911 (not itself controlled by the control system) which may be a small synchronous clock motor and associated movement, and which is adapted to rotate, at a predetermined slow rate, a paper or cardboard recording chart 912; the chart being secured by a clamping nut 913 of conventional type, to a shaft 914 of the synchronous motor mechanism 911. The same motor mechanism is also mechanically connected to rotate a double lobe cam 915 at a correlated predetermined rate, say 1 R. P. M. The cam may conveniently be of the nature illustrated, having a relatively gradual rise and a long steep fall, and may be rotated, as seen in Figs. 9A and 9B, in a clockwise direction when the other parts are arranged as shown.

A lever 916, pivoted at one end 917 to the frame of the apparatus, carries a roller follower 918, for engagement with the cam. At the end of the lever 916 there is attached a cord 919, which runs over a threaded pulley 920, conveniently with several turns thereon, and which is maintained under tension at all times by a spring 921 on the other side of the pulley. The pulley is mechanically connected to rotate a counter or accumulating device 922, which may be of conventional construction, through a one-way clutch or ratchet mechanism 923, in such fashion that as the lever 916 is moved downwardly by the cam 915, the pulley runs free of the counter, but on the return stroke of the lever 916 (following its release from a high spot of the cam) under the tension of the spring 921, the pulley effects a corresponding rotation of the drive shaft of the counter 922.

That is, the spring 921 is tensioned by each downward displacement of the lever 916 and upon release of the latter by the cam, the resulting reverse rotation of the pulley 920 clutches the mechanical connection to the drive shaft of the counter, and operates the latter to an extent dependent upon the distance of upward travel of the lever 916. A small friction spring 924 is advantageously disposed in pressure against a drive shaft for the counter, in order to obviate any tendency of such shaft to coast or to rotate in a reverse direction.

The mechanism illustrated also includes a suitable servo-motor such as a shaded pole motor 925, which can be connected for energization and control from the transmitting system, as explained in connection with certain of the preceding figures.

Through suitable gearing or other mechanical connection the motor is arranged to rotate a pair of worms or screws 926, 927. Threaded on the screw 926 is a suitable nut or collar, 928, carrying an indicator pointer, and adapted to be moved horizontally across a scale 929 in accordance with the rotation of the motor. The worm or screw 927 likewise has threaded thereon a collar 930, which is connected to displace a pen arm 931 to provide the desired record on the chart 912, i. e., the collars 928 and 930 being held against rotation relative to the frame of the apparatus, and being thereby shiftable in a horizontal direction in accordance with rotative displacement of the motor 925.

A rack member 932 is mechanically secured to the collar 930, for displacement therewith, and for rotation of a cooperating pinion 933, to adjust the rotor 934 of an inductor device 935. Thus the instrumentalities just described afford means operated by the motor 925 for effecting follow-up adjustment of an inductor device, and also for shifting an indicator pointer and a recording pen arm. It will be understood that the inductor 935 may be of the type diagrammatically illustrated in preceding figures, such as, for instance, the receiving inductor shown in Fig. 8 as comprised of a stator 824 and a rotor 821. The inductor may conveniently have air core stator and rotor windings, although in some cases a core of iron or like material may be employed.

The rack member 932 conveniently comprises a vertically disposed plate of appreciable area, as shown, and on one of its vertical faces there is secured a positioning bar or camming strip 940, disposed at an angle to the vertical, which may be adjusted (for calibration of the totalizer operation) by shifting the releasable clamping screw 941 along an arcuate slot 942 in the rack member 932. A vertically slidable rod 945 is disposed with its upper end in firm but gentle contact with the under side of the bar 940 and is maintained in such contact by the upward thrust of a suitable spring 946. The lower end of the rod 945 is disposed in the path of an end portion 947 of the lever 916, and it will now be seen that in accordance with the lateral adjustment of the rack member 932, the lower end of the rod 945 is raised or lowered. The extent of upward motion of the lever 916, upon each release of a high spot of the cam 915, is thereby dependent upon the position of the lower end of the rod 945; and the extent of rotation or operation of the counter for each of the periodic upward displacements of the lever, is varied proportionately.

It will thus be seen that by virtue of the instrumentalities just described the intermittent rotations of the totalizer or counter 922 are directly and accurately varied in extent, in accordance with the position of the rack 932 and collar 930, all in corresponding proportion to the positional adjustment of the motor 925 and to the chlorinator negative pressure, or flow of chlorine or other quantity being measured by the telemetric system in which the illustrated device is connected. Thus the apparatus shown provides positive, reliable and immediate response to variations of the quantity under measurement, not only with an indicator pointer and a recorder pen, but also on a counting or accumulating device. At the same time, the receiving inductor or like circuit-controlling instrumentality is positively displaced to a position for the restoration of balance in the control circuit, whereupon movement of the motor 925 and rack 932 ceases,—the counter 922 continuing, of course, to totalize the chlorine flow or the like at the rate indicated by the adjusted position of the rack 932.

In the specific apparatus shown, it will be understood that the mechanical connection intermediate the motor 925 and the screws 926, 927, may conveniently be such as to provide for relative displacement of the collars 928 and 930 in a two-to-one ratio, so that the former will have a range entirely across the scale 929 while the latter, for appropriate recording on the chart 912, has a range one-half as great.

In order to arrest the counter 922 during periods of zero chlorine flow or the like, the rod 945 may conveniently be of such length as to depress the follower 918 (on the lever 916, which the rod engages) just below, and clear of the highest part of cam 915 whenever the collar 930 moves to the position of zero flow. It should also be noted that for proportional compensating purposes (as in cooperation with the cams 805 and 806 of Fig. 8, or as indicated by the cam 131 in Fig. 2), if desired, the mechanical connection between pinion 933 and inductor 935 may comprise a compensating cam 954 rotatable by the pinion and having a follower 955 on an arm 956 secured to the shaft of inductor rotor 934, the follower being biased against the cam by a spring 957.

For convenience, other instrumentalities of the associated electrical transmitting system can be enclosed in the same casing 910, viz. the potentiometers 950, 951 and 952 (indicated by dotted lines on Fig. 9) which may be, for instance, the potentiometers 822, 816 and 818, of Fig. 8. To avoid possible damage of carefully adjusted parts —as upon displacement of the collars 928 and 930 to the very ends of their paths of travel— the mechanical drive from the servo-motor 925 may advantageously include a friction clutch 960, adapted to slip if any driven part is arrested before the motor is.

In the light of the foregoing description and accompanying figures, it will now be appreciated that the present invention affords reliable means and efficient procedure for recording or otherwise indicating the flow of materials, such as chlorine, in a chlorinator or other device, in satisfaction of the several objects and purposes hereinabove recited, and with other features of novelty and advantage as elsewhere set forth herein or as incidental to the described arrangements. Moreover, the described arrangements may be applied to a number of other uses or purposes; thus for example, the proportional pressure-amplifying instrumentalities (including a tube displaceable in a liquid, in the manner of Figs. 5, 6 and 7) may be utilized to provide a reduction in pressure variation in circumstances where the same is desirable (e. g., in obtaining a reduced variation of pressures across a venturi in a water main), by providing control variations of level of a heavy liquid (e. g., mercury) and utilizing a light liquid (e. g., water or carbon tetrachloride) in the subordinate vessel such as vessels 524, 626 or 714.

It will be understood that in the appended claims, as well as generally in the foregoing specification, the terms "indicator," "indicating means," and the like, are employed in a generic sense and thus to include, for instance, recording, totalizing or other proportionally controlled devices and procedure, as well as simpler instrumentalities such as the pointer and scale 929 of Fig. 9. It will also be understood by those skilled in the art, that the several figures have been simplified for clarity and ease of illustration; for instance, in Fig. 6, the bottom of the central chamber 606 is preferably, in practice, lower than as shown—so as to afford a wider range of operation for the apparatus.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

I claim:

1. In feeding apparatus wherein the feed is effected by a pressure difference across a feeding element and in accordance with variations of pressure on one side thereof, the combination of pressure-responsive indicating means having a pressure-transmitting control line therefor connected with the aforesaid side of the feeding element, and means responsive to a predetermined variation of pressure on the other side of the feeding element for altering the pressure in the control line to an abnormal value and independently of the pressure on the first-mentioned side of the feeding element, said pressure-variation-responsive means including control means therefor responsive to pressure change, on said other side of the feeding element, in a direction toward equality of pressure with the pressure on the first-mentioned side of the element, whereby the resulting alteration of pressure in the control line causes adjustment of the indicating means to a position indicating undesired diminution of the feed through the feeding element.

2. The combination with a pressure feeding element for feeding gas and means for varying the pressure on one side thereof, of pressure conduit means having associated means normally establishing therein a pressure differing from atmospheric pressure, when gas is being fed, and varying with the variations of pressure on the aforesaid side of the said feeding element, translating means connected to said conduit means and adjustable in accordance with the variations of pressure in said conduit means, to detect changes in the rate of feed of gas, and means responsive to a predetermined variation of pressure on the other side of said element and independent of the pressure on said one side theerof, for opening the conduit means to the atmosphere and thereby causing adjustment of the translating means to an abnormal position non-representative of gas flow.

3. In gas-handling apparatus, the combination, with apparatus including conduit means for gas flow, for feeding gas from a source of supply to a point of use at a rate of flow variable through a predetermined range, of gas-responsive measuring means having connection to said conduit means, for producing indications representative of the rate of gas flow, said measuring means being adjustable through a normal range of indications corresponding to said predetermined range of the variable rate of gas flow, and means controllable by the feeding apparatus and having direct controlling connection to said measuring means at a point therein beyond the connection of the latter to the conduit means, for causing the measuring means to produce an indication outside of the aforesaid normal range of indications thereof, in response to failure of gas supply to the feeding apparatus, said last mentioned means comprising control means therefor connected to the feeding apparatus ahead of said conduit means in the path of gas flow from the source, and responsive to gas supply failure regardless of existence, in the conduit means at the point of connection of said measuring means, of a gas pressure corresponding to normal gas flow.

4. In gas-handling apparatus, in combination, with means for feeding gas from a source of supply to a point of use, which means includes gas-conducting means connectible at one end to the source of supply and at the other end to the point of use, means controlling said gas-conducting means at the first-mentioned end thereof for maintaining at said end a pressure of substantially predetermined value during maintenance of gas supply and means associated with the said conducting means beyond said first mentioned end and comprising pressure-reducing means interposed in the conducting means and pressure-controlling means connected with the conducting means on the other side of said pressure-reducing means from the first-mentioned end of the conducting means, for providing a variable reduction in pressure therein for passing gas therethrough and at a rate of flow corresponding to the extent of reduction in pressure, gas-responsive measuring means including connecting means therefor communicating with the gas-conducting means at a point on the other side of the pressure-reducing means from the first mentioned end, for providing indications representative of the rate of gas flow through a predetermined range of minimum to maximum flow, and means connected to the first-mentioned end of the gas-conducting means and adapted to control the measuring means for causing the latter to provide an indication outside the said range, in response to a predetermined departure of the pressure at said first-mentioned end from the aforesaid predetermined value.

5. Apparatus of the vacuum feed type for supplying a flow of gas, comprising a gas feeding system, means producing a vacuum for drawing gas through said system from a source of supply of gas, said system including gas-conducting means wherein the pressure when the apparatus is functioning is a measure of the amount of gas being supplied, a pressure-measuring device connected to said gas-conducting means, and a pressure responsive control device communicating with the system and operable in response to failure of the gas supply and adapted for control of said measuring device, for causing the latter to indicate said failure, said apparatus comprising means responsive to pressure drop caused by gas supply failure for substituting another gas for that normally supplied in the feeding system, and said control device being responsive to said pressure drop of an extent substantially less than that which would represent total failure of gas flow.

6. Gas-handling apparatus comprising a gas feeding system adapted to extend to a source of supply of gas, means associated with the outlet of said system, for producing a negative pressure for drawing gas through said system from said source of supply, a pressure-dropping feeding element in the system and associated means maintaining a pressure of not lower than a predetermined value on the supply side of said element during maintenance of gas supply, whereby variations of pressure on the further side of said element are a measure of changes in the rate of feed of gas, pressure-responsive measuring means having connection to said system on said further side of said element, for indicating rate of feed of gas, and pressure-controlled means communicating with the system on the supply side of the element and responsive to predetermined decrease of pressure there, for disassociating said measuring means from response to pressure on the further side of the element.

7. The apparatus of claim 6, wherein the associated means includes means normally maintaining pressure on the supply side of the element substantially constant at the aforesaid predetermined value, and the means for disassociating the measuring means from pressure response includes control means therefor, responsive also to increase of pressure on said supply side, above said predetermined value.

8. Means for indicating exhaustion of chlorine supply in a vacuum chlorinator, which includes means for conducting chlorine gas to a point for use and means establishing a vacuum for causing passage of the chlorine through said conducting means at a rate of flow dependent on the vacuum, comprising pressure-responsive means normally controlled by the chlorinator and shiftable in response to variations of the vacuum, to indicate chlorine flow, and means responsive to exhaustion of chlorine gas in the chlorinator, for disassociating said pressure-responsive means from response to vacuum variations and for thereby shifting said pressure-responsive means to a position corresponding to not more than a zero flow of chlorine.

9. In apparatus for feeding gas in accordance with variations of a pressure condition applied to the gas, in combination, means for passing the gas through the apparatus, a control device adapted to operate an indicator, means for adjusting said device in response to the variations of the said pressure condition, to indicate gas flow, said first mentioned means including means for supplying the gas to said first-mentioned means at a pressure within a predetermined range and means for applying the controlling pressure condition to the gas passed by the first-mentioned means, and means controlled by the gas-supplying means in response to such departure of the supplied gas pressure from said range as represents approaching exhaustion of gas supply and controlling said device independently of said first-mentioned adjusting means, for adjusting said control device to a predetermined condition representative of complete interruption of gas flow.

10. A vacuum type gas feeding apparatus having means for passing gas therethrough from a source of gas supply to a point of use and means for automatically substituting air for gas in the apparatus upon exhaustion of the gas supply, in combination, indicating means remotely located from the apparatus, means controlled by the apparatus for detecting exhaustion of the gas supply, and means controlled by said last-mentioned means upon detection of said exhaustion, for operating the indicating means to indicate said exhaustion.

11. Apparatus for controlling and recording the flow of gaseous chlorine for addition to an aqueous liquid flowing through a main, comprising means responsive to the flow of said aqueous liquid for establishing a negative fluid pressure having a magnitude which is a predetermined function of such flow, a feeding apparatus for gaseous chlorine constructed and arranged so that the amount of gaseous chlorine fed thereby will be directly controlled by the magnitude of said negative pressure and including a chlorine outlet conduit communicating with said negative pressure, a liquid containing vessel, means for controlling the level of liquid in said vessel in response to said negative pressure, a float in said vessel positioned in accordance with said liquid level, means responsive to the position of said float to control an independent transmitting medium in amplified proportionality to said negative pressure, and means insulated from contact with said chlorine gas by said independent transmitting medium and directly controlled thereby for indicating the rate of feed of chlorine gas.

12. Indicating apparatus for a vacuum type chlorinator which includes vacuum feed means for passing chlorine gas to a point of use at a rate of flow variable with variations of vacuum, comprising, in combination, conduit means adapted to transmit variations of vacuum from the chlorinator, indicating means controllable in response to variations of an intermediate control medium and having associated means for conducting said medium thereto, means connected with said conduit means for control by variations of vacuum therein, and including amplifying means associated in output to said medium-conducting means, for varying the intermediate control medium in accordance with variations of the chlorinator vacuum, and means operable in response to exhaustion of chlorine gas supply in said chlorinator, for varying the intermediate control medium in a predetermined direction to a point outside the range of variations of said medium which are representative of variations of chlorine flow in the chlorinator.

13. In means for indicating the feed of chemical feeding apparatus, wherein the chemical feed is controlled by pressure variations, in combination, chemical feeding means, including pressure means for controlling advance of the chemical at a rate varying with variations of the pressure and dependent upon the requirements of the material to which the chemical is fed, a control element, pressure sensitive means including a vessel for liquid and means for establishing a liquid level therein corresponding in position to the pressure in the feeding apparatus for adjusting the position of the control element, pressure-operated indicating means responsive to changes in a pressure which is separate and distinct from the first mentioned pressure, and amplifying means adjustable in position and controlled by said control element in accordance with the adjustment thereof for effecting amplified operation of said indicating means, said amplifying means including a source of pressure for operating said indicating means, a vessel to hold liquid of substantially greater specific gravity than the liquid in the first mentioned vessel, and liquid-head controlled means associated with the second mentioned vessel for controlling the pressure from said source effective to control said indicating means in accordance with the relative positions of said liquid-head controlled means and said second mentioned vessel, said control element being adapted to adjust the relative position of said second mentioned vessel and said liquid-head controlled means.

14. The combination with means for feeding gas to a point of use, including a gas handling element, means establishing a gas-advancing pressure difference across said element and means for varying the pressure on one side of said element, of an adjustable electrical transmitting instrument and a circuit controlled thereby for transmitting detectable electrical variations in accordance with adjustment of the instrument, means responsive to pressure variations in the feeding means at the aforesaid side of the element for adjusting said instrument, an electrical circuit-controlling device connected to said instrument for rendering same ineffective to control the aforesaid circuit, gas-handling means in the feeding means and communicating with the aforesaid element at the other side thereof, and means controlled by said last-mentioned gas-handling means and responsive to a predetermined variation of pressure in said gas-handling means for operating the aforesaid circuit-controlling device.

15. Means for adjusting a transmitting instrument under control of a source of variations of fluid pressure, comprising, in combination with an adjustable transmitting instrument for transmitting detectable variations of a control medium, a vessel for liquid, pressure-controlled means adapted to respond to the pressure variations of said source, for varying the liquid level in said vessel, float means carried by the liquid in said vessel, and means controlled by the float means and adapted to adjust the transmitting instrument in response to positional variations of the float means, said level-varying means including means enclosing the float-means in said vessel and means communicable with said source for introducing the pressure variations into said enclosing means, and said float-controlled means comprising an element extending out of said vessel from the float means, and having associated liquid sealing means around said element, to afford free displacement of the latter while preventing air communication intermediate the inside and outside of the said enclosing means, said transmitting instrument including two relatively movable elements and an interposed liquid.

16. Means for adjusting a transmitting instrument under control of a source of variations of fluid pressure, comprising, in combination with an adjustable transmitting instrument for transmitting detectable variations of a control medium, a vessel for liquid, pressure-controlled means adapted to respond to the pressure variations of said source, for varying the liquid level in said vessel, float means carried by the liquid in said vessel, and means controlled by the float means and adapted to adjust the transmitting instrument in response to positional variations of the float means, said level-varying means comprising a liquid-containing U-tube having one leg connected with the liquid in said vessel and having another leg enclosed at its upper end, liquid handling means, including liquid-level controlled means for regulating the quantity of liquid in said U-tube, for maintaining the liquid in said second leg at a predetermined constant level, below the enclosure thereover, and means adapted to be controlled by the pressure variations of said source, and including pressure-transmitting means adapted to be connected to said source, for varying the pressure in the space above the liquid in the said second leg.

17. In means for indicating the flow through a gas-handling element wherein the gas is advanced in accordance with variations of a pressure difference across the element, the combination of an adjustable electrical transmitting instrument, indicating means electrically controlled thereby, means including control means therefor communicating with said element, and responsive to the aforesaid variations of pressure difference, for adjusting said instrument, and thermally-responsive means associable with the element, for varying the electrical output of the instrument to correct said output for the effect of temperature changes on the weight of gas flowing, said instrument having an associated circuit connecting it for control of the indicating means, said circuit being voltage-responsive and biased to prevent current flow therein, and said instrument and said thermally-responsive means being respectively adapted to vary the voltage alone in said circuit.

18. In a gas-handling device having an element through which gas is fed in accordance with a variable difference of pressure across the same and including means for passing the gas through said element, the combination of means including control means therefor communicating with said element, for converting variations of said pressure difference into variations of electrical potential, and associated means including a thermally-variable resistor disposed in the path of the gas for varying said potential to compensate for the effect of temperature changes on the gas, said pressure converting means including voltage-responsive translating means and control circuit therefor which is biased to prevent current flow, and said resistor being adapted to adjust the potential variations introduced in said circuit by said pressure-converting means.

19. The combination with a gas-handling element and means for establishing a variable difference of pressure across said element, of an adjustable electrical transmitting instrument, means responsive to variations of said difference of pressure for adjusting said instrument, and electro-thermally-responsive means associated with the element for varying the electrical output of the instrument in accordance with changes of temperature of the gas, said gas handling element comprising a flow-responsive pressure reducing conduit device, and said means for establishing a difference of pressure comprising means establishing on the outlet side of said element a negative pressure adapted to be varied for adjusting gas flow and means on the inlet side of said device for maintaining the pressure of the entering gas at least within a predetermined range, said electro-thermally-responsive means being disposed for control by the temperature of the gas at the entering side of said element.

20. Pressure translating apparatus for measuring variations of a variable negative pressure, comprising, in combination, a liquid-holding chamber adapted to receive the variable negative pressure above the liquid, a liquid-containing vessel in liquid communication with the liquid in the chamber, liquid-handling means for maintaining the liquid in the chamber at a constant level, said liquid handling means comprising means associated with the chamber and responsive to increase of liquid level therein above a predetermined level to discharge liquid therefrom and means for supplying liquid to the communicating system of said chamber and vessel, whereby the level of liquid in the vessel varies substantially only in accordance with variations of negative pressure in the chamber, and control means including adjustable control apparatus for performing control operations in accordance with adjustment thereof and means responsive to variations of liquid level in the vessel for adjusting said control apparatus whereby variations of the negative pressure are translated into adjustments of the control means.

21. Pressure translating apparatus for measuring variations of negative pressure from a source of variable negative pressure, comprising, in combination, a liquid-containing U-tube, means for supplying liquid to one leg of said tube at a constant rate, liquid-sealed outlet means for withdrawing liquid from the tube upon rise of liquid in the other leg above a predetermined level to maintain the level constant therein, float means in the first-mentioned leg of the tube, and means enclosing the second-mentioned leg for receiving a variable negative pressure therein above the liquid, and for subjecting the liquid to said pressure, including means adapted to be connected to a source of variable negative pressure, whereby variations of the negative pressure are translated into positional adjustments of the float means.

22. Pressure translating apparatus for detecting changes in a plurality of related variable negative pressures from related sources thereof, comprising, in combination, a liquid-containing U-tube, a second liquid-containing U-tube disposed for overflow of liquid from one leg thereof into one leg of the first U-tube, means for supplying liquid to the second U-tube at a constant rate, closure means for each of the other legs of the respective U-tubes whereby the liquid in each may be subjected to a negative pressure, liquid-outlet means for preventing rise of liquid above a predetermined level in the second-mentioned leg of the first U-tube, adjustable control apparatus, means for adjusting the latter in accordance with variations of liquid level in the first leg of the first U-tube, and means including a control device associated with the second leg of the second U-tube and controlled by the liquid level therein, for effecting a predetermined abnormal adjustment of said apparatus in response to a predetermined variation of liquid level in the second leg of the second U-tube, whereby the control apparatus is normally responsive to variations of a negative pressure applied to the first U-tube, and affords an emergency response to a variation of a negative pressure applied to the second U-tube.

23. Pressure translating apparatus, comprising means adapted to communicate with a source of variable pressure, and including a liquid-containing vessel, for converting variations of said pressure into corresponding variations of level of a liquid of low specific gravity in said vessel, control means controlled by said first-mentioned means and positionally adjusted in accordance with said variations of liquid level in said vessel, pressure conduit means and means comprising a body of liquid of high specific gravity and a control element connected to the conduit means, said control element being operated by said control means and shiftable relative to the surface of said last-mentioned liquid by displacement of the aforesaid control means, whereby the first-mentioned pressure variations are amplified in the conduit means.

24. Means for amplifying the variations of negative pressure in a vacuum type gas feed device, comprising means adapted to communicate with the gas feed device, and including a liquid-containing vessel, for converting the variations of negative pressure into variations of head of a liquid of low specific gravity in said vessel, means controlled by said first-mentioned means and including a second liquid-containing vessel, for converting said variations of head into variations, dimensionally as great, in the effective head of a liquid of high specific gravity in said second vessel, a source of positive pressure and means controlled by said second-mentioned means and connected with said source for varying the pressure therefrom in accordance with the variations of head of the liquid of high specific gravity.

25. In means for indicating gas flow in a feeding apparatus wherein the gas is fed in accordance with variations of pressure difference across a feed element, in combination, a liquid-containing U-tube having each leg closed above the level of liquid therein and having float means in the liquid of each leg, means for transmitting the pressures on the opposite sides of the feed element, respectively to the two legs of the U-tube, whereby the float means vary in relative position in accordance with the variations of pressure difference across the feed element, and translating means controlled by the positional differential of the float means, said translating means comprising a pressure line having a source of pressure connected thereto, a vessel mechanically associated with one of the float means and adapted to contain a heavy liquid, a tube connected to the pressure line and mechanically associated with the other of the float means and adapted to extend into the liquid in the vessel, and pressure-responsive indicating means controlled by the pressure line, whereby amplified pressure variations are produced in the line for operation of the indicating means, in accordance with variations of the extent of submergence of the tube in the heavy liquid.

26. In means for indicating the gas flow in a plurality of devices wherein the gas is handled in accordance with variations of negative pressure, the combination of a liquid-containing vessel having float means therein, a plurality of associated closed liquid-containing vessels each communicating, below the liquid, with the liquid in the first vessel, and respectively adapted to receive negative pressure from the respective gas-handling devices, whereby each of the closed vessels withdraws liquid from the first-mentioned vessel in response to variations of the applied negative pressure, and translating means controlled by displacement of the float means.

27. In combination with a plurality of vacuum-controlled gas feeding devices, a liquid-containing vessel, means for withdrawing liquid therefrom in response to the vacuum of one feeding device, means for withdrawing liquid therefrom in response to the vacuum of another feeding device, means non-linearly proportioning the withdrawal of liquid by each of said means relative to variations of the controlling vacuum, for varying the liquid level in the aforesaid vessel linearly with variations of gas flow in each feeding device, and translating means controlled by the liquid level in the vessel, for adjustment thereby in accordance with the sum of the gas flows in said devices.

28. In combination with a plurality of vacuum-controlled gas feeding devices, a corresponding plurality of transmitting means each comprising an electrical transmitting device adjustable in voltage output, means controlled by the vacuum of the associated feeding device for adjusting the transmitting device in accordance with variations of gas flow, said last-mentioned means including thermo-electric means for compensating adjustment of the transmitting device relative to the temperature of the gas, and means responsive to exhaustion of gas supply in the feeding device for short-circuiting the transmitting device; means connecting the transmitting devices in series; an electrical receiving device normally adapted to oppose the combined voltage of the series-connected transmitting devices; indicating means; and means including an amplifier responsive to voltage unbalance intermediate the transmitting and receiving devices, for operating the indicating means to indicate variations in the total gas feed of the plurality of feeding devices, and to provide a predetermined low indication upon exhaustion of gas supply in any of the feeding devices.

29. The combination of claim 28 in which the indicating means comprises a servo-motor controllable from the amplifier, a positioning element, an indicating arm adjustable by the servo-motor, means simultaneously actuated by said motor for adjusting the receiving device to restore voltage balance with the transmitting devices, and for adjusting the positioning element, reciprocable means biased for displacement in one direction, independently driven cam means for periodically shifting the reciprocable means in the other direction, whereby the same is periodically released for displacement in the first-mentioned direction, means responsive to the adjustment of the positioning element for limiting the extent of said displacement, a counter, and means for operating the counter in response to each said displacement of the reciprocable member and in proportion to the extent of said displacement, whereby the total amount of gas fed by the plurality of feeding devices is accumulated on the counter.

30. Indicating apparatus comprising, in combination, indicating means adapted to be adjusted by a control motor and having connections for adjustment of a follow-up instrument, a lever, means biasing one end of the lever to move in one direction, stop means in the path of said end of the lever, means controlled by the indicating means for adjusting the position of the stop means, cam means for periodically shifting the lever in the other direction and releasing it to move in the first-mentioned direction, and an accumlating device progressively operated by successive movements of the lever in the first-mentioned direction and in accordance with the extent thereof.

31. The apparatus of claim 30, including a marking element adjusted by the indicating means, means for operating a chart to be marked by said element, and common driving means for the last-mentioned means and the aforesaid cam means, whereby a record may be made of variations in the controlling quantity which is totalized by the accumulating device.

32. Pressure translating apparatus, comprising means adapted to communicate with a source of variable pressure and including a vessel containing a body of liquid, for converting the variations of pressure into corresponding variations of level of the liquid in said vessel, control means positionally controlled by said first mentioned means in accordance with said variations of liquid level, pressure conduit means and means for controlling the conduit means, comprising a body of liquid of different specific gravity than said first-mentioned liquid and a control element communicating with the conduit means and opening within, and beneath the surface of, said second-mentioned body of liquid, to relieve pressure in said conduit means to the extent of the liquid head above the opening of said control element, said conduit-controlling means being controlled by the first-mentioned control means for adjustment of the position of said control element relative to the surface of said second-mentioned liquid in accordance with the position of the aforesaid control means, whereby the first-mentioned pressure variations are reproduced in modified form, in the conduit means.

33. Means for amplifying the variations of negative pressure in a vacuum type gas feed device, comprising means for converting the variations of negative pressure into variations of head of a liquid, said first-mentioned means including pressure-transmitting control means therefor communicating with the gas feed device, means for converting said variations of head into variations, dimensionally as great, in the effective head of a liquid of greater specific gravity than that of the first-mentioned liquid, a source of positive pressure and means for varying the pressure therefrom in accordance with the variations of head of the liquid of higher specific gravity.

34. Measuring apparatus for response to change in a negative pressure, comprising in combination, means for holding a liquid including two portions connected together below the level of the liquid therein, one of said portions being closed at its upper end and communicating above the level of liquid therein with the negative pressure to be measured, the other of said portions being open to the atmosphere at its upper end, liquid handling means associated with one of said portions for maintaining liquid therein at a predetermined constant level, a float in the other of said portions responsive to the level of liquid therein and hence responsive to changes in the negative pressure to be measured, control means connected to said float so as to be positioned thereby, and an indicating means arranged to be operated by said control means for indicating said negative pressure and changes therein.

35. Means for adjusting a transmitting instrument under control of a source of variations of fluid pressure, comprising in combination, a transmitting instrument adapted for modifying a control medium to transmit adjustments of the instrument a closed liquid-holding vessel having means communicable with said source for changing gas pressure above the liquid in accordance with variations of the pressure of said source, a second liquid holding vessel in communication with the liquid in the first vessel, liquid handling means for maintaining the liquid in one of said vessels at a constant level, and control means associated with the other of said vessels and controlled by the level of the liquid in said other of said vessels for adjusting the transmitting instrument in accordance with said variations of level.

36. In means for detecting the flow through a gas handling element wherein the gas is advanced in accordance with variations of a pressure difference across the element, the combination of an adjustable electrical transmitting instrument establishing a control voltage in accordance with adjustment of the instrument, means including a voltage-responsive circuit controlled by the instrument and a translating device controlled by said circuit and in accordance with voltage changes therein, for transmitting and translating adjustments of the instrument into adjustments of said device, means including control means therefor communicating with said element, and responsive to the aforesaid variations of pressure difference, for adjusting the instrument, voltage dividing means comprising a pair of resistors connected in series and across said instrument, one of said resistors comprising a thermally controllable resistance device associated with the gas-handling element and adapted to be adjusted in resistance in accordance with temperature changes of the advancing gas, and the other of said resistors being arranged to be substantially unaffected by said temperature changes of the gas, and said voltage-responsive circuit being connected, for control thereof by the instrument, across one and only one of said resistors, whereby the electrical control of the circuit by the instrument is corrected for the effect of temperature changes on the gas flowing.

37. The apparatus described in claim 36, wherein the thermally controllable resistance device is a resistant element made of material which increases its resistance with increase of temperature, said resistance element being disposed in thermal communication with the advancing gas; and wherein the control circuit is connected only across the said other one of the resistors.

JOHN R. MacKAY.